US012122111B2

(12) United States Patent
Berlioux et al.

(10) Patent No.: US 12,122,111 B2
(45) Date of Patent: Oct. 22, 2024

(54) APPARATUS FOR MANUFACTURING BEAD WIRES FOR PNEUMATIC TIRES COMPRISING A HEAD FOR SWITCHING BETWEEN CUTTING AND CRIMPING TOOLS

(71) Applicant: Compagnie Generale Des Etablissements Michelin, Clermont-Ferrand (FR)

(72) Inventors: Loic Berlioux, Clermont-Ferrand (FR); Christophe Amyot, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 560 days.

(21) Appl. No.: 17/416,307

(22) PCT Filed: Dec. 18, 2019

(86) PCT No.: PCT/FR2019/053137
§ 371 (c)(1),
(2) Date: Jun. 18, 2021

(87) PCT Pub. No.: WO2020/136322
PCT Pub. Date: Jul. 2, 2020

(65) Prior Publication Data
US 2022/0072818 A1   Mar. 10, 2022

(30) Foreign Application Priority Data

Dec. 27, 2018 (FR) ............................... 20180074244
Jan. 31, 2019 (FR) ............................... 20190000951

(51) Int. Cl.
*B29D 30/48* (2006.01)
*B21F 11/00* (2006.01)
(Continued)

(52) U.S. Cl.
CPC .............. *B29D 30/48* (2013.01); *B21F 11/00* (2013.01); *B21F 15/06* (2013.01); *B21F 37/00* (2013.01);
(Continued)

(58) Field of Classification Search
CPC ... B29D 30/48; B29D 2030/487; B21F 37/00; B21F 37/02; B21F 15/06; B21F 11/00; Y10T 29/5187; Y10T 29/5137
(Continued)

(56) References Cited

U.S. PATENT DOCUMENTS 2,708,228 A    5/1955  Crabbe et al.
3,212,947 A *  10/1965  Vanzo .................... B29D 30/48
                                                 156/422
(Continued)

FOREIGN PATENT DOCUMENTS

FR    3091199 A3 *   7/2020
JP    51-119775 A *  10/1976
(Continued)

OTHER PUBLICATIONS

Machine translation of JP 2007-160640 A, which JP '640 was published Jun. 2007.*

*Primary Examiner* — Erica E Cadugan
(74) *Attorney, Agent, or Firm* — Dickinson Wright PLLC; Steven C. Hurles

(57) ABSTRACT

The installation for manufacturing a bead wire intended to reinforce a pneumatic tire, said installation comprising a receiving table which is adapted to receive a braided torus which comprises a braid wire which extends longitudinally from a first end section to a second end section, a cutting tool, a crimping tool adapted to crimp a sleeve around said first and second end sections, and a configuration unit which is adapted automatically to switch the installation from a (Continued)

cutting configuration in which the receiving table cooperates with the cutting tool so as to position the braided torus and the first and second end sections so that said first and second end sections are sectioned by the cutting tool to a crimping configuration in which the receiving table cooperates with the crimping tool.

15 Claims, 10 Drawing Sheets

(51) Int. Cl.
    *B21F 15/06*     (2006.01)
    *B21F 37/00*     (2006.01)
    *B21F 37/02*     (2006.01)

(52) U.S. Cl.
    CPC ..... *B29D 2030/487* (2013.01); *Y10T 29/5137* (2015.01); *Y10T 29/5187* (2015.01)

(58) Field of Classification Search
    USPC .................. 140/88, 111, 113; 29/33 F, 564.1
    See application file for complete search history.

(56) References Cited

U.S. PATENT DOCUMENTS 5,099,892 A * 3/1992 Siegenthaler .......... B29D 30/48
    140/88
2008/0277040 A1* 11/2008 Okamoto ............... B29D 30/48
    29/505

FOREIGN PATENT DOCUMENTS

JP      2007160640 A      6/2007
JP      2008024247 A      2/2008

* cited by examiner

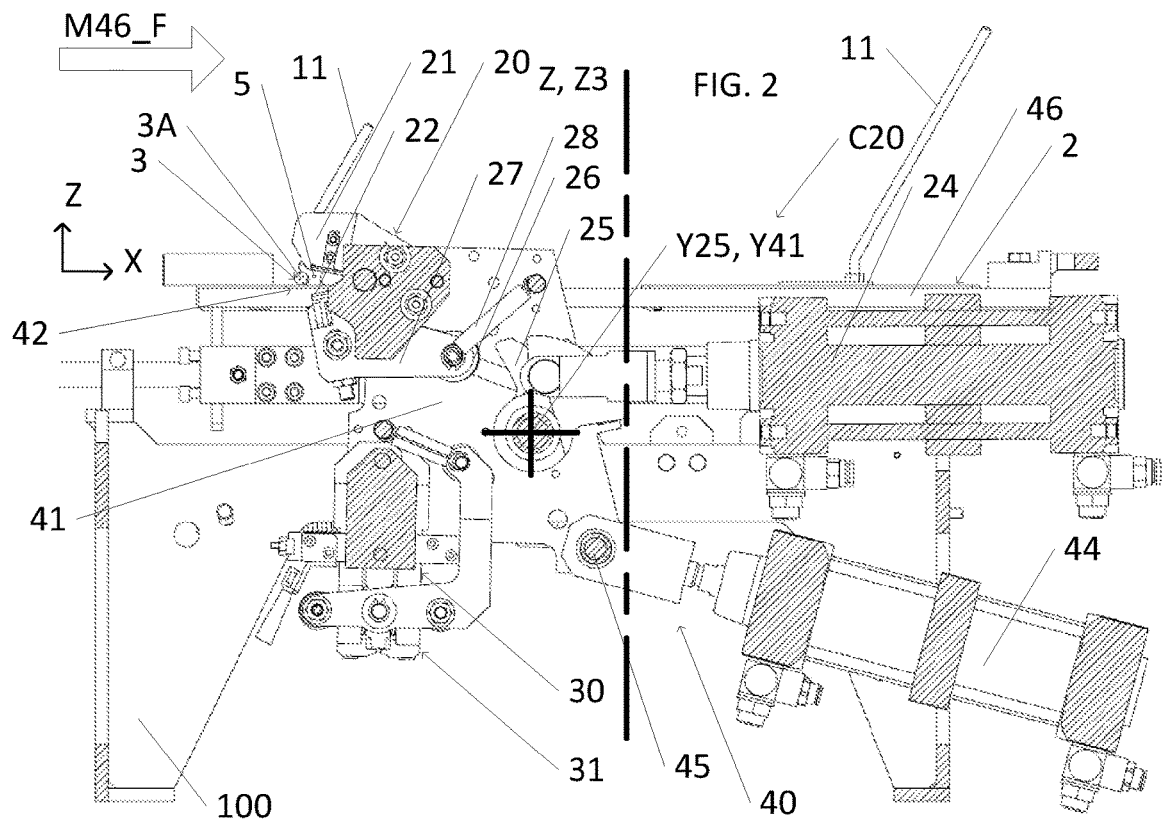
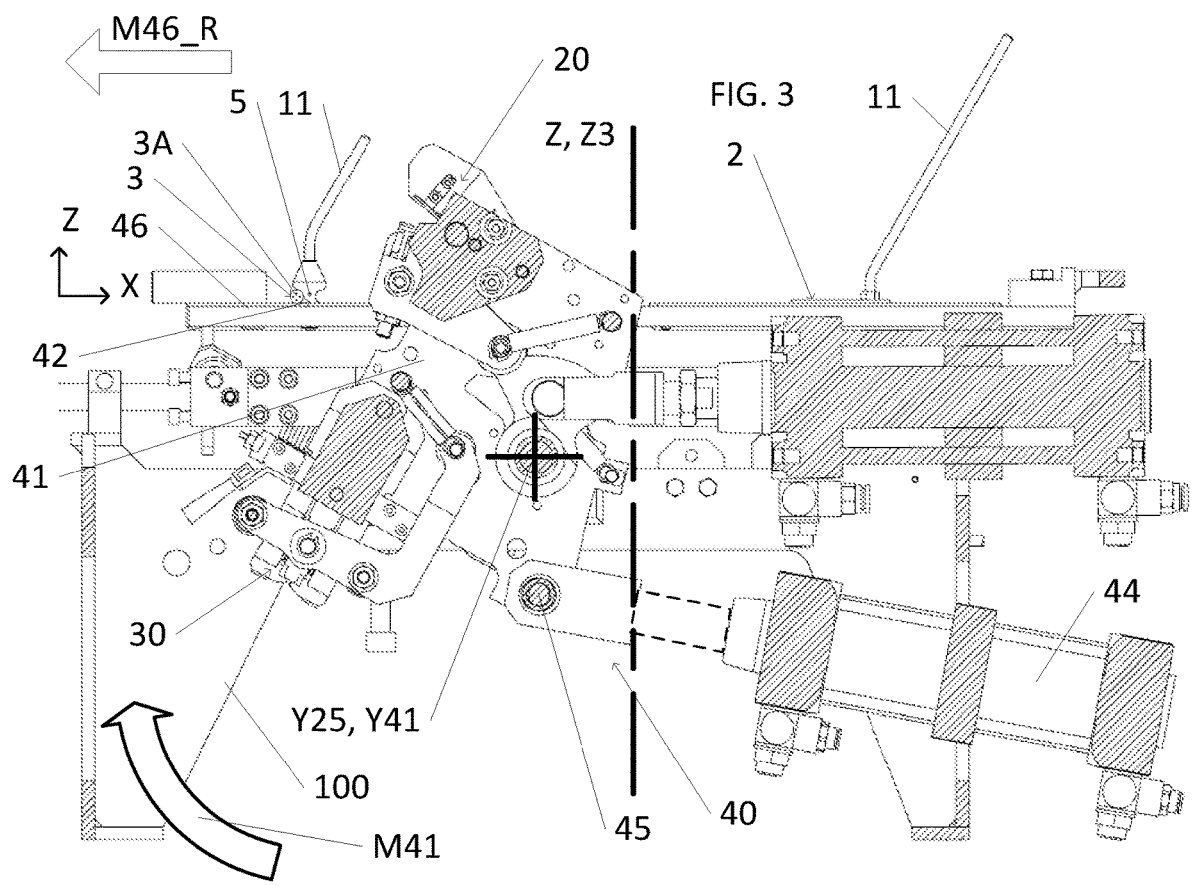

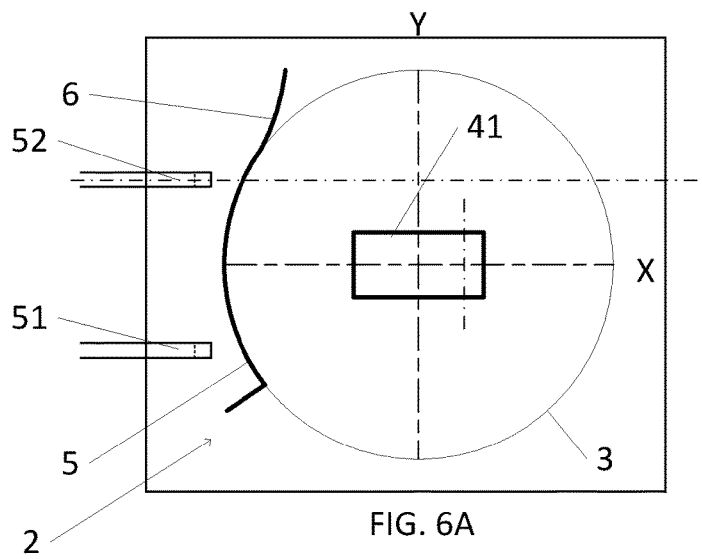 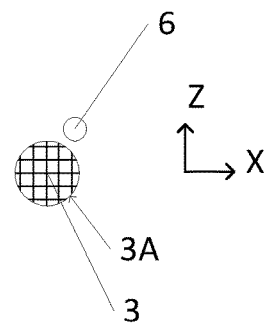
FIG. 6A  FIG. 6B
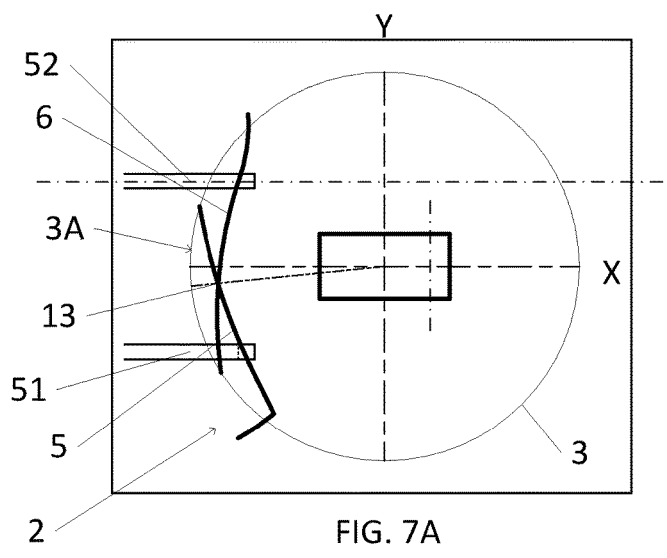 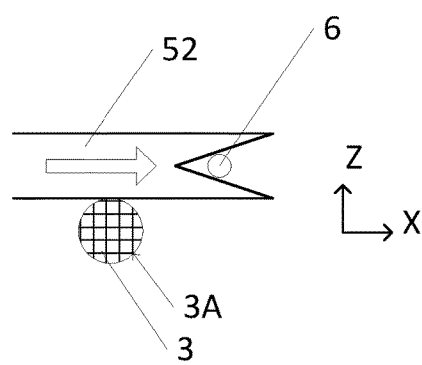
FIG. 7A  FIG. 7B
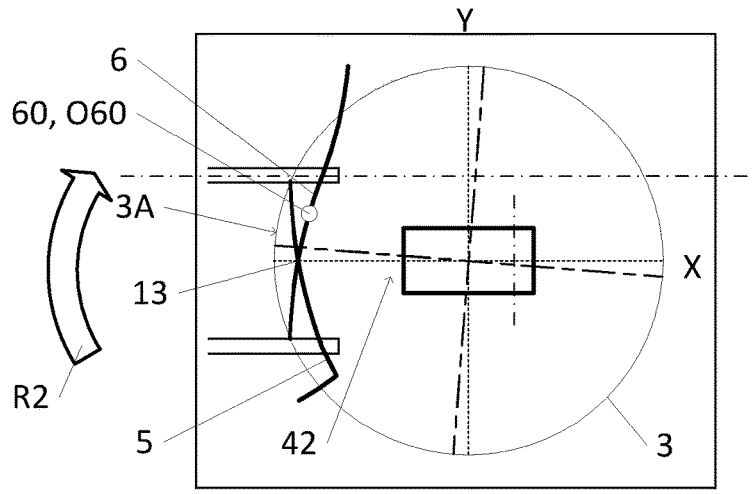 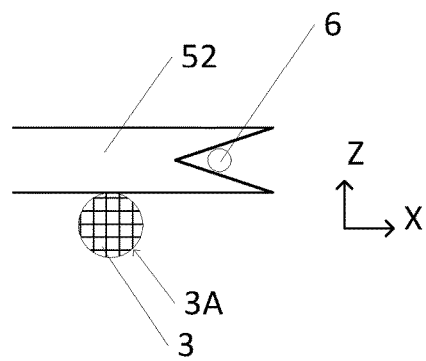
FIG. 8A  FIG. 8B

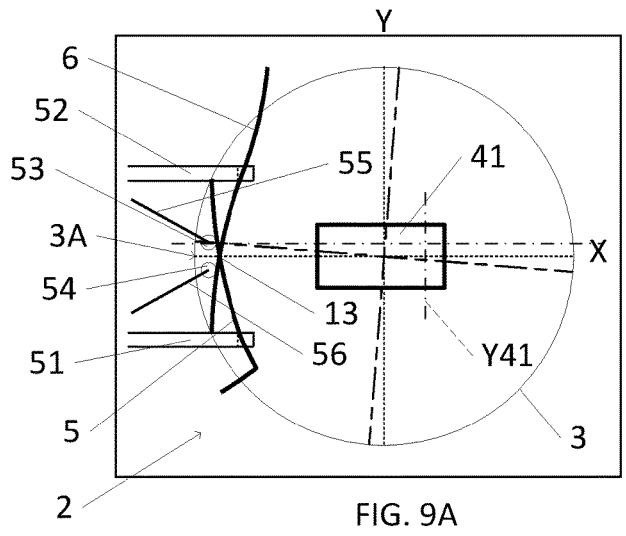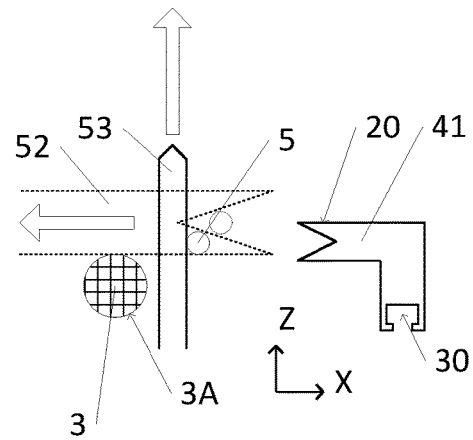
FIG. 9A    FIG. 9B
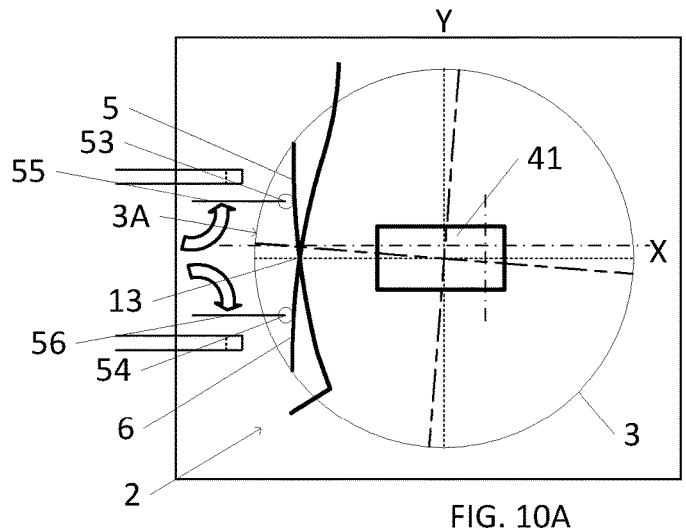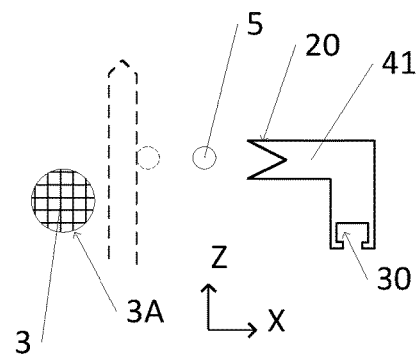
FIG. 10A    FIG. 10B
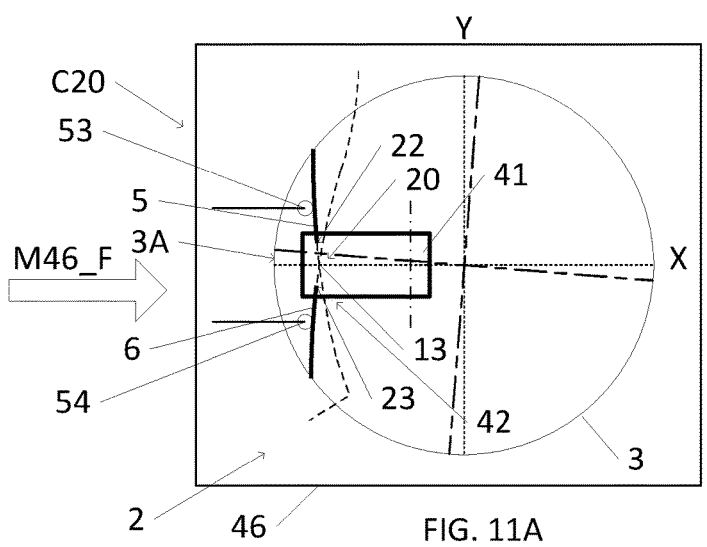
FIG. 11A    FIG. 11B Reloading Tool for Placing a New Sleeve Preform in the Crimper

FIG. 20

APPARATUS FOR MANUFACTURING BEAD WIRES FOR PNEUMATIC TIRES COMPRISING A HEAD FOR SWITCHING BETWEEN CUTTING AND CRIMPING TOOLS

CROSS-REFERENCE TO RELATED APPLICATION

This application claims priority to and the benefit of PCT Patent Application No. PCT/FR2019/053137 filed on 18 Dec. 2019, entitled "APPARATUS FOR MANUFACTURING BEAD WIRES FOR PNEUMATIC TIRES COMPRISING A HEAD FOR SWITCHING BETWEEN CUTTING AND CRIMPING TOOLS", and French Patent Application No. 20190000951, filed on 31 Jan. 2019, entitled "APPARATUS FOR MANUFACTURING BEAD WIRES FOR PNEUMATIC TIRES COMPRISING A HEAD FOR SWITCHING BETWEEN CUTTING AND CRIMPING TOOLS" and French Patent Application No. 20180074244, filed on Dec. 27, 2018, entitled "APPARATUS FOR MANUFACTURING BEAD WIRES FOR PNEUMATIC TIRES COMPRISING A HEAD FOR SWITCHING BETWEEN CUTTING AND CRIMPING TOOLS".

BACKGROUND

1. Field

The present disclosure concerns the field of the manufacture of reinforcing bead wires that are intended to reinforce tires, in particular pneumatic tires, in order to retain said tires on a rim.

In a manner known in itself, a bead wire takes the form of an annular rigid material, generally metal, element that may consist of a strand comprising a plurality of interlaced braid wires.

It is therefore known, during the manufacture of a bead wire, to provide an operation of braiding during which a braid wire is wound in helicoidal turns around a core that is closed on itself in a ring so as to obtain a braided torus, followed by a joining operation during which the ends of said braid wire are fixed to one another, for example by means of a crimped sleeve, in order to produce the cohesion of the braided torus in the form of an annular element that will constitute the bead wire.

To this end, it is necessary to adjust the length of the ends of the braid wires by means of a cutting operation preceding the joining operation and then to engage the sleeve to be crimped on said ends.

These operations are sometimes difficult, which can make it difficult to reproduce them from one bead wire to another.

Moreover, it sometimes happens that the sleeve is incorrectly placed on the ends of the braid wire, which leads to rejection of the bead wire, and thus to a waste of raw material and energy.

2. Related Art

In an attempt to alleviate these drawbacks, there has been proposed, for example by the document JP-2007-160640, using tubular sleeves of very specific shape, including an internal central abutment that separates two end housings, together with positioning jaws that are also very specific comprising chamfered mouths deemed to facilitate the insertion of the end sections of the wire in said end housings of the sleeve.

This kind of solution, which can undoubtedly increase the reliability of crimping, nevertheless requires precise positioning of the sleeve in the positioning jaws, followed by careful manual insertion of each of the wire end sections in the corresponding housing of the sleeve, and finally, when all the elements have been pre-assembled, triggering crimping.

A method of this kind is therefore time-consuming and tedious, and what is more costly, and this all the more so in that the specific shape of the sleeves complicates the production of said sleeves.

SUMMARY OF THE INVENTION

The objects assigned to the disclosure therefore aim to remedy the aforementioned disadvantages and to propose a new installation for manufacturing bead wires that enables bead wires to be manufactured rapidly, at relatively low cost, and reliably.

The objects assigned to the disclosure are achieved by means of an installation for manufacturing a bead wire intended to reinforce a tire, in particular a pneumatic tire, said installation including:
  a receiving table that is adapted to receive a braided torus that includes at least one wire, termed "braid wire", that extends longitudinally from a first end section to a second end section and that is interlaced in helicoidal turns around and along a generatrix line that forms a ring around a principal axis that corresponds to the central axis of said braided torus,
  a cutting tool adapted to section the first end section and the second end section in order to adjust the length of said first and second end sections,
  a crimping tool adapted to crimp a sleeve around said first end section and said second end section in order to join and to fix said first and second end sections to one another,
said installation including a configuration unit that is adapted to cause said installation to pass automatically from a first working configuration, termed "cutting configuration", in which the receiving table cooperates with the cutting tool in such a manner as to position the braided torus and the first and second end sections so that said first and second end sections are sectioned by the cutting tool, to a second working configuration, termed "crimping configuration", distinct from the first working configuration, in which the receiving table cooperates with the crimping tool in such a manner as to position the braided torus and the first and second end sections so that the crimping tool joins said first and second end sections by means of the sleeve.

The configuration unit advantageously enables automatic chaining of the cutting and crimping operations and precise and reproducible execution of said operations in a very short time.

It is therefore in particular possible to carry out in the same installation all the operations necessary for sleeving the bead wire, and this with great accuracy, since it is possible to retain the same frame of reference tied to the installation to position the braided torus and the cutting and crimping tools automatically with respect to one another.

Moreover, as will emerge hereinafter, the disclosure enables the provision of a kinematic chain for reconfiguring the manufacturing installation that is particularly favorable to the compactness and the efficacy of said installation.

BRIEF DESCRIPTION OF THE DRAWINGS

Other objects, features and advantages of the disclosure will appear in more detail on reading the following description as well as with the aid of the appended drawings provided by way of nonlimiting illustration only, in which drawings:

FIG. 2 illustrates in a sectional view from the side a pivoting switching head that is part of the configuration unit of the installation from FIG. 1, that carries both the cutting tool and the crimping tool, and that is in the cutting configuration, with the cutting tool in position at a working location where said cutting tool is able to engage the end sections of the wire.

FIG. 3 illustrates in a sectional view from the side the switching head from FIG. 2 during pivoting to pass from the cutting configuration to the crimping configuration.

FIG. 6A illustrates in a diagrammatic view from above a first set of paddle type spreader members in an initial position relative to the braided torus before said first spreader members engage the end sections.

FIG. 6B illustrates in a diagrammatic sectional view from the side the braided torus in the configuration that corresponds to FIG. 6A.

FIG. 7A illustrates in a diagrammatic view from above the intervention of the spreader members of the first set in order to capture the first and second end sections and to move the latter away from the body of the braided torus, here by pushing said end sections elastically toward the interior of the braided torus.

FIG. 7B illustrates in a diagrammatic sectional view from the side the braided torus in the configuration that corresponds to FIG. 7A.

FIG. 8A illustrates in a diagrammatic view from above the movement of the braided torus, here in rotation in azimuth, that is effected by the receiving table in a first search phase in order to detect one of the first and second projecting end sections by means of an end section sensor while the projecting first and second end sections are supported by bearing on and sliding on the paddles forming the spreader members of the first set.

FIG. 8B illustrates in a diagrammatic sectional view from the side the braided torus in the configuration that corresponds to FIG. 8A.

FIG. 9A illustrates in a diagrammatic view from above the intervention of retaining fingers that are part of a second set of spreader members that are positioned between the body of the braided torus and the first and second end sections in the space created by the spreader members of the first set in order to be able to support said first and second end sections during subsequent engagement/disengagement movements of the receiving table relative to the cutting and crimping tools.

FIG. 9B illustrates in a diagrammatic sectional view from the side the braided torus during the manoeuvre of inserting the spreader members of the second set corresponding to FIG. 9A.

FIG. 10A illustrates in a diagrammatic view from above a secondary deployment of the spreader members of the second set encountering the first and second end sections, here by angular opening of the retaining fingers, followed by withdrawal of the spreader members of the first set, namely the paddles, for which the retaining fingers are therefore substituted, in order to clear the working zone in which the cutting tool and then the crimping tool will be able to operate.

FIG. 10B illustrates in a diagrammatic sectional view from the side the ongoing projection of an end section obtained by the bearing effect procured by a spreader member of the second set, here a retaining finger, deployed in accordance with the configuration from FIG. 10A.

FIG. 11A illustrates in a diagrammatic view from above the cutting operation for adjusting the length of the first and second end sections, after the braided torus has been in the cutting tool, by a movement of engagement of the receiving table and while the first and second end sections are still supported by the spreader unit, here by the retaining fingers forming the spreader members of the second set.

FIG. 11B is a diagrammatic sectional view from the side of the configuration from FIG. 11A.

FIG. 20 schematically depicts a reloading tool.

DETAILED DESCRIPTION OF THE ENABLING EMBODIMENTS

The present disclosure concerns an installation 1 for manufacturing a bead wire 9 intended to reinforce a tire, in particular a pneumatic tire.

By way of example, these bead wires 9 intended to retain such pneumatic tires on a rim may be adapted to equip pneumatic tires of which the dimensions, here more particularly the diameter of the rim to which the diameter of the bead wire 9 corresponds, are between 13 inches and 24 inches inclusive. The disclosure is of course applicable to the manufacture of bead wires 9 intended for pneumatic tires for private vehicles, in particular with the aforementioned dimensions, but also for the manufacture of bead wires 9 intended for pneumatic tires for heavy goods vehicles or for civil engineering machines.

The installation includes a frame 100.

For convenience of description, it will be considered that this frame 100 geometrically defines a frame of reference termed a "fixed frame of reference" comprising a preferably horizontal reference plane (X, Y) as well as a preferably vertical reference axis Z that is normal to the reference plane (X, Y).

"Abscissa axis" will designate the axis X, horizontal here, of the reference plane (X, Y) and "ordinate axis" the axis Y, here horizontal, that with the abscissa axis X defines the reference plane (X, Y) and that forms with the abscissa axis X and the vertical reference axis Z an orthonormal trihedron.

Figure 5:
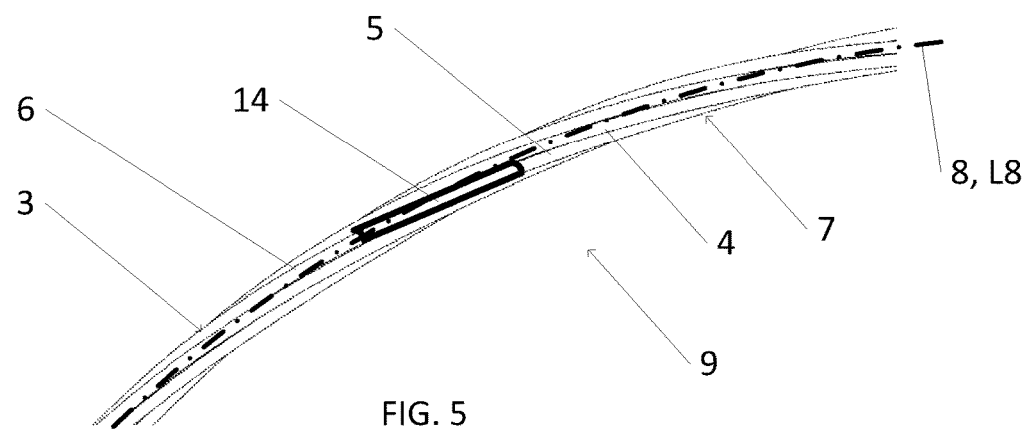
FIG. 5 illustrates in a partial perspective view a bead wire obtained in accordance with the disclosure after the first and second end sections and the sleeve that connects them have returned elastically against the body of the braided torus.

The installation 1 includes a receiving table 2 that is adapted to receive a braided torus 3 which, as can be seen in FIG. 5 in particular, includes at least one wire 4, termed a "braid wire", that extends longitudinally from a first end section 5 to a second end section 6 and that is interlaced in helicoidal turns 7 around and along a generatrix line L8 that forms a ring around a principal axis that corresponds to the central axis Z3 of said braided torus 3.

The braid wire 4 is preferably a metal, for example steel, wire, possibly coated with a protective layer. Alternatively, without departing from the scope of the disclosure, said braid wire 4 could be made of any appropriate material having a sufficiently high Young's modulus (modulus of elasticity) and in particular an appropriate polymer material, or an appropriate mixture of polymer materials, or a metal and polymer composite material.

The braid wire could preferably have a section diameter between 1.20 mm and 3.5 mm inclusive, for example chosen from 1.30 mm, 1.55 mm, 1.75 mm, 2.00 mm and 3.00 mm.

The braid wire 4 could be shaped during a preceding braiding step in which the helicoidal turns 7 are shaped to obtain the braided torus 3. The cutting, respectively crimping, operations in accordance with the disclosure will take place after this braiding operation.

Figure 17:
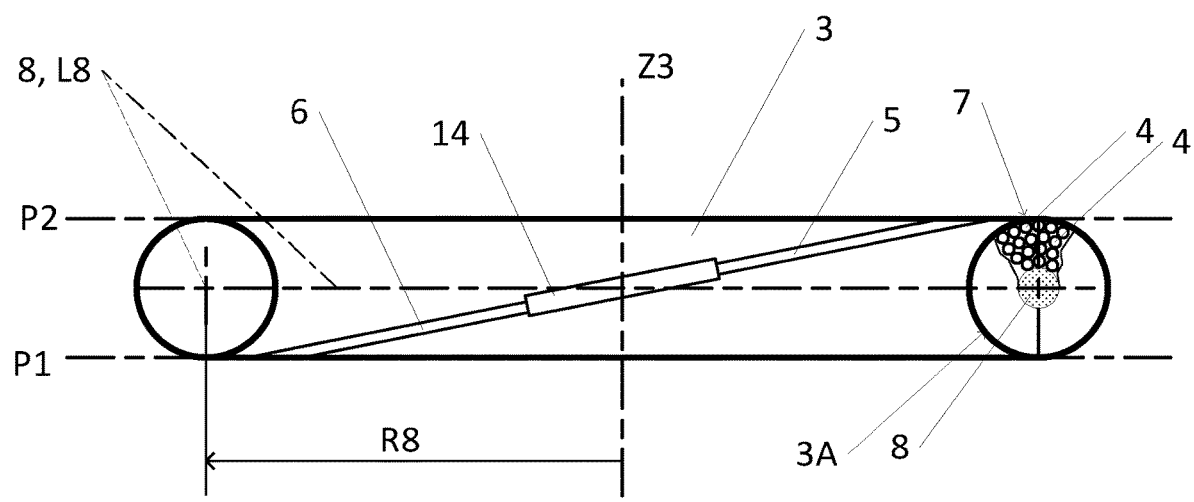
FIG. 17 illustrates in a diagrammatic side view from inside the braided torus the positioning of the sleeve in accordance with the disclosure so that said sleeve, once the end sections and said sleeve have returned elastically to the position against the turns of the braided torus, is strictly contained on the radially internal face of said braided torus without projecting outside the braided torus either axially or radially.

The braid wire 4 advantageously extends continuously, that is to say in one piece, from the first end section 5 that precedes the helicoidal turns 7 to the second end section 6 that follows on from the helicoidal turns 7, and said braid wire 4 performs a plurality of complete turns in azimuth about the central axis Z3, each completed turn having the effect of adding one unitary section of said braid wire 4 to the overall section of the braided torus 3, as can be seen in particular in the detail partial section illustrated in FIG. 17.

In practice the generatrix line L8 that is represented in dashed line in FIGS. 1, 5, 17 and 18 could preferably consist of a core 8 that is closed on itself in a ring, preferably with a circular shape, around the principal axis Z3.

Said core 8 advantageously forms a braiding support around and along which the braid wire 4 is wound in helicoidal turns 7, as mentioned above.

Said core 8 may be a single-strand core, that is to say formed of a single monolithic core wire, or alternatively a multi-strand core, that is to say formed of a plurality of interlaced core wires.

The core 8 or the core wires could be made of any appropriate material that is sufficiently rigid and has a tensile strength above a predetermined threshold.

The core 8 or the core wires are preferably metal, for example steel, wires.

Alternatively, without departing from the scope of the disclosure, another material could nevertheless be used, for example an appropriate polymer, or an appropriate mixture of polymers, or a metal-polymer composite material.

The receiving table 2 will preferably include guide members 10, 11 such as rollers 10 and/or centring rods 11 enabling the braided torus 3 to be positioned on and guided along a predetermined path on said receiving table 2. For convenience of description this path could be deemed to be the same as the generatrix line L8 and the plane corresponding thereto that contains said generatrix line L8 could be termed the "guide plane".

Figure 12A:
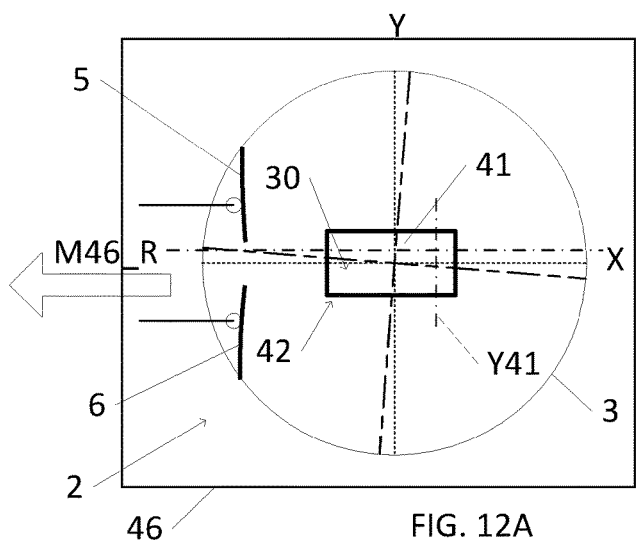
FIG. 12A illustrates in a diagrammatic view from above the disengagement movement performed by the receiving table in order to manoeuvre the braided torus in order to withdraw it and to extract said braided torus from the cutting tool while the first and second end sections are still supported by the spreader members of the second set on said receiving table, to enable the positioning system to switch the cutting and crimping tools so as to place the crimping tool in position to receive the braided torus instead and in place of the cutting tool.

The installation 1 also includes a cutting tool 20 adapted to section the first end section 5 and the second end section 6 in order to adjust the length of said first and second end sections 5, 6 as illustrated in FIGS. 11A and 12A.

The cutting tool 20 will enable the end sections 5, 6 to have a predetermined residual length suitable for the subsequent fitting of a sleeve 14.

More preferably, following the braiding operation and before the cutting operation, the end sections 5, 6, seen in projection in the reference plane (X, Y), initially cross at a crossover point 13 and the effect of the cutting tool 20 is to shorten the first and second end sections 5, 6 on either side of said crossover point 13 in order to interrupt each end section 5, 6 before it reaches said crossover point, as can be seen in FIG. 11A.

The sleeve 14 could therefore then form a bridge between the first and second end sections 5, 6 substantially where the crossover point 13 was located so that said end sections 5, 6 are finally arranged in longitudinal alignment with one another without overlapping longitudinally inside the sleeve 14. This facilitates the crimping operation and improves the compactness of the sleeved joint.

The cutting tool 20 preferably includes a cutter 21.

Figure 1:
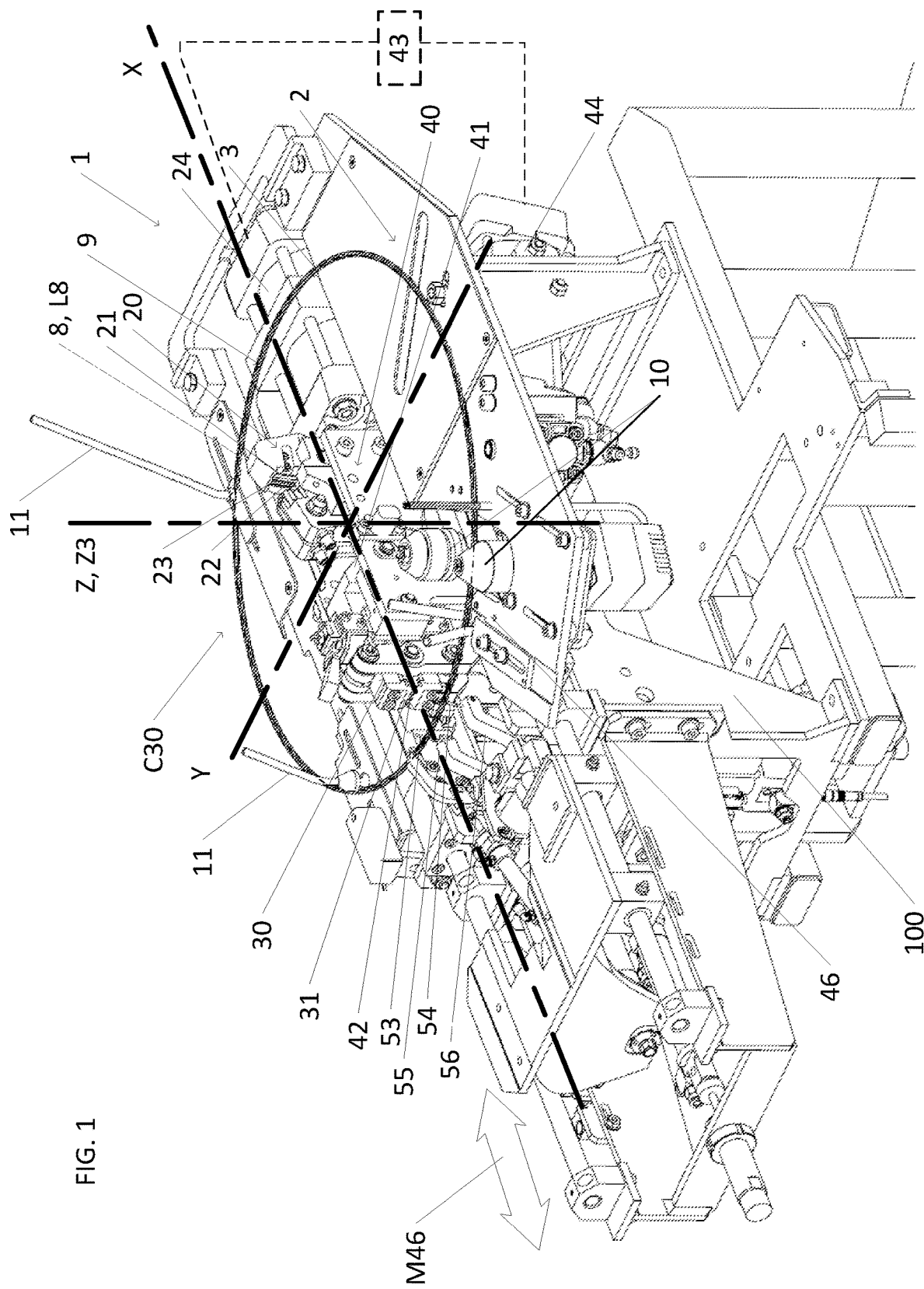
FIG. 1 illustrates in a perspective general view an example of an installation in accordance with the disclosure.
Figure 19:
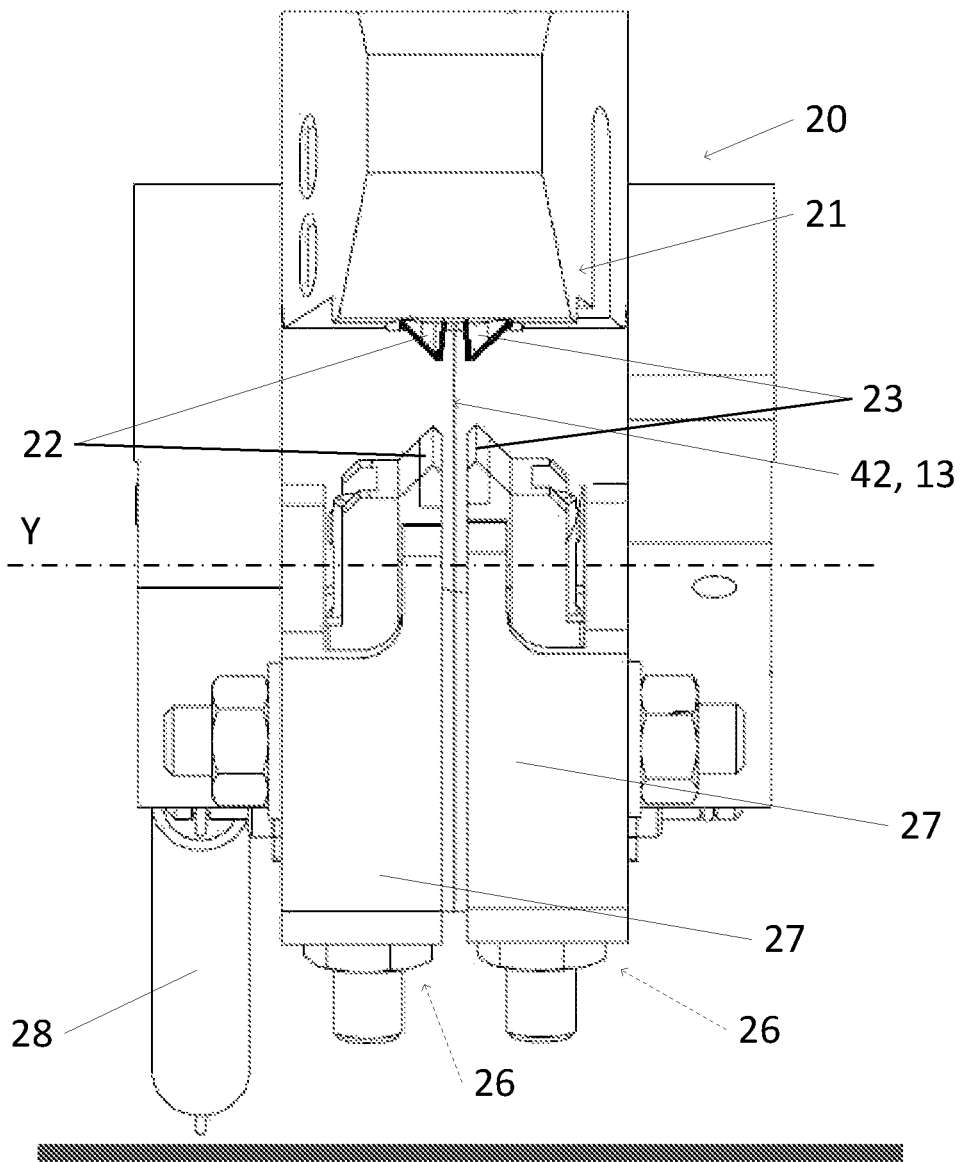
FIG. 19 illustrates in a detail view from the front a cutting tool with two sets of blades used in the installation from FIGS. 1 to 4.

As can be seen in FIGS. 1, 11A and 19, said cutter 21 may preferably include a first set of blades 22 for cutting the first end section 5 and a second set of blades 23 for cutting the second end section 6.

The cutting tool 20 will of course include a preferably automatic actuator mechanism for activating the closure of the cutter 21 in order to cut the end sections 5, 6.

As illustrated in FIG. 2, this mechanism will preferably include a motorized actuator member 24 such as an actuator cylinder 24.

Said actuator cylinder 24 could for example be coupled to a cam 25 that cooperates with an actuator roller 26 carried by a cutting lever 27 which drives a set of blades 22, 23 to close them against the action of a return spring 28.

In this instance, the cam 25 could be mounted on the frame 100 to rotate about a cam axis Y25 parallel to the ordinate axis Y with the actuator cylinder 24 mounted to pivot on that same frame 100.

It will be noted that this cam, roller, cutting lever and return spring mechanism could where appropriate be duplicated for each set of blades 22, 23 so that each of said sets of cutters could be actuated independently of the other.

In fact, in accordance with a particularly preferred feature that may constitute a disclosure in its own right, the cutter 21 has a differential action, the second set of blades 23 being to this end adapted to act after the first set of blades 22 has finished cutting the first end section 5.

In other words, the cutting tool 20 is preferably adapted to cut the end sections 5, 6 one after the other and not simultaneously.

To this end, there could be provided a pair of cams 25 offset axially, here along the ordinate axis Y, and angularly shifted relative to one another to actuate successively two cutting levers 27 each associated with one of the sets of blades 22, 23 and each carrying a roller 26 engaged by one of said two cams 25. Each of said cutting levers 27 will preferably be independently returned by its own return spring 28.

This kind of cutter 21 comprising two sets of blades 22, 23 on the ordinate axis Y on either side of the crossover point 13 and two corresponding cutting levers 27 is illustrated in FIG. 19.

Thus having a time difference between the two cutting operations advantageously makes it possible, at each moment of the cutting operation, to concentrate the cutting force on only one end section 5, 6 at a time, and consequently on only one braid wire 4 section.

This reduces the cutting force necessary. The cutting operation therefore requires less power, which advantageously enables reduction of the size of the cutting tool 20 and the actuator mechanism and limitation of wear of the cutter 21.

The installation 1 also includes a crimping tool 30 adapted to crimp a sleeve 14 around the first end section 5 and the second end section 6 in order to join and to fix to one another said first and second end sections 5, 6.

Crimping on a sleeve 14 advantageously enables a robust joining of the end section 5, 6 to be obtained simply, rapidly and with low consumption of energy, and more particularly joining of said end sections 5, 6 without welding. This joint guarantees the cohesion of the braided torus 3 by definitively preventing the helicoidal turns 7 from unwinding or loosening.

The crimping tool 30 preferably includes a crimper 31 that is adapted to receive a sleeve preform 12 and then to press and to close by plastic deformation said sleeve preform 12 into the form of a sleeve 14 around the first and second end sections 5, 6.

Figure 16:
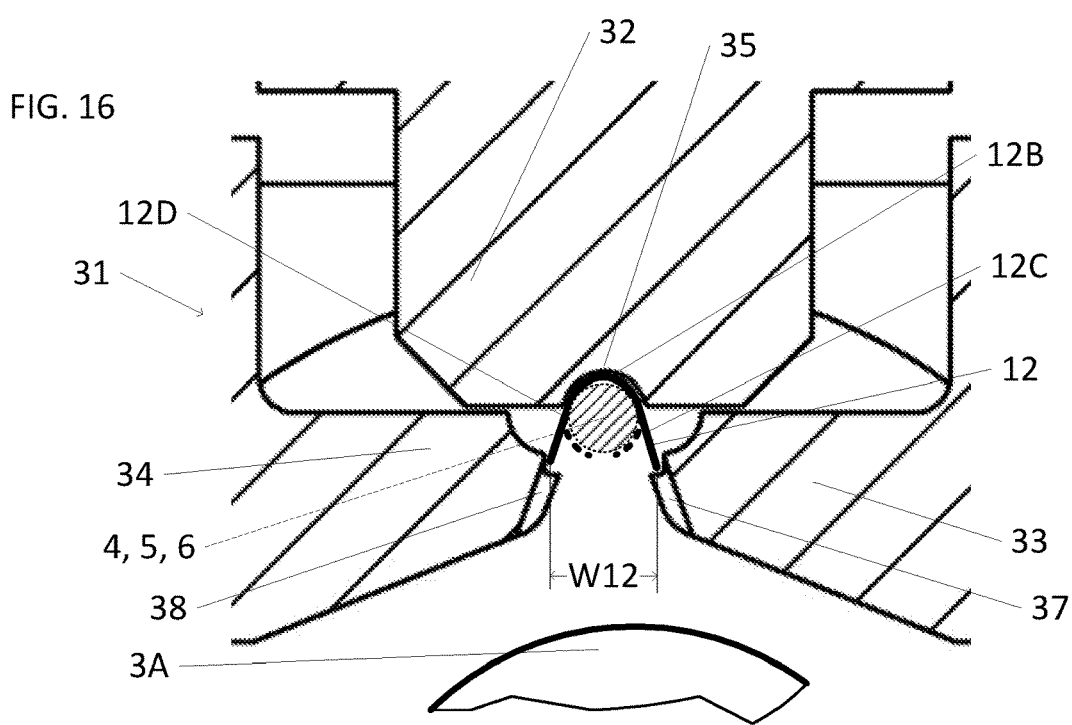
FIG. 16 illustrates in a sectional detail view the crimper from FIG. 2 fitted with a sleeve preform intended to be deformed plastically around the wire to form the sleeve.

Said sleeve preform 12 is preferably slit over all its length so that, as can be seen in FIG. 16, said sleeve preform has a U-shaped concave curved cross section that comprises a rounded bottom 12B and two flared lateral branches 12C, 12D.

The sleeve preform 12 therefore preferably has along all its length an opening the width W12 of which is equal to or greater than the greatest diameter of the first wire end section 5 and the second wire end section 6 as shown diagrammatically in FIG. 16 so that the crimper 31 can apply the sleeve preform 12 to said wire end sections 5, 6 by offering it up laterally, transversely to the longitudinal direction of said wire end sections 5, 6.

The sleeve preform 12 therefore as it were forms a slit sleeve that the crimper 31 will be able to close around and to clamp onto the end sections 5, 6 of wire 4 by bending the lateral branches 12C, 12D against the perimeter of the section of said wire 4 in an angular sector of said section of the wire 4 that is situated in the half-plane diametrically opposite, relative to the center of the section of the wire 4, the half-plane that contains the angular sector of the wire 4 against which the bottom 12B of the sleeve preform 12 comes to be applied.

This kind of lateral, transverse approach is advantageously easy to implement and easy to automate, in particular because it dispenses with the need to thread the sleeve 14 and more particularly the sleeve preform 12 longitudinally onto each of the end sections 5, 6.

Moreover, the dimensions of the sleeve preform 12 and more particularly the cumulative length of the bottom 12B and of the lateral branches 12C, 12D are advantageously chosen so that the sleeve 14 that results from the plastic bending of the sleeve preform 12 on itself grips inside it a single section of a wire 4, that is to say so that the sleeve 14 envelops only one section of a wire 4 and is therefore coaxial with each of the unitary end sections 5, 6 of said wire 4.

In particular, in the case of a braided torus 3 that includes in the same torus cross section a plurality of unitary sections of the braid wire 4 each corresponding to one helicoidal turn 7, then the dimensions of the sleeve preform 12 and more particularly the cumulative length of the bottom 12B and the lateral branches 12C, 12D of said sleeve preform 12, that is to say the arc length that said sleeve preform 12 is able to cover around the longitudinal direction of the braid wire 4 when said sleeve preform has been bent into its final shape as the sleeve 14, therefore preferably correspond to a fraction, typically 65% to 100%, preferably 70% to 99%, or even 75% to 95%, of the perimeter of a single unitary section of the braid wire 4, so that the sleeve 14 finally contains only one unitary section of braid wire 4, the other unitary sections of the braid wire 4 in the same cross section of the braided torus 3 then being outside the sleeve 14, as can be seen in particular in FIG. 5.

In other words, the dimensions of the sleeve 14 will preferably be such as not to envelop all of the sections of the braided torus 3, that is to say not to envelop all the turns 7 of the braid wire 4, but only the unitary section that corresponds to the joint between the first and second end sections 5, 6.

This therefore and advantageously avoids creating an extra thickness of material on the bead wire 9 and more particularly on the radial external surface of the bead wire 9, which makes it possible for said bead wire 9 not to have an abrasive character for rubber-based plies that constitute the casing of the pneumatic tire, in particular the carcass ply.

It will also be noted that, once the sleeve preform 12 has been closed to form a sleeve 14 over the end sections 5, 6, and more particularly a unitary section of the braid wire 4 corresponding to the section of said end sections 5, 6, the lateral branches 12C, 12D preferably do not overlap and preferably do not touch edge-to-edge, in other words the sleeve 14 covers less than 100% of the circumference of the section of the wire 4. This therefore avoids creating any unnecessary increased thicknesses of material.

By way of illustration, the front width of the preferably metallic strip constituting the sleeve preform 12, that is to say the cumulative length of the bottom 12B and the lateral branches 12C, 12D, considered in a cross section of the sleeve preform 12 perpendicular to the longitudinal direction of said sleeve preform 12, will preferably be between 4 mm and 7 mm inclusive in order typically to cover, as mentioned above, between 70% and 99% of the circumference of a (unitary) section of wire 4.

Figure 15:
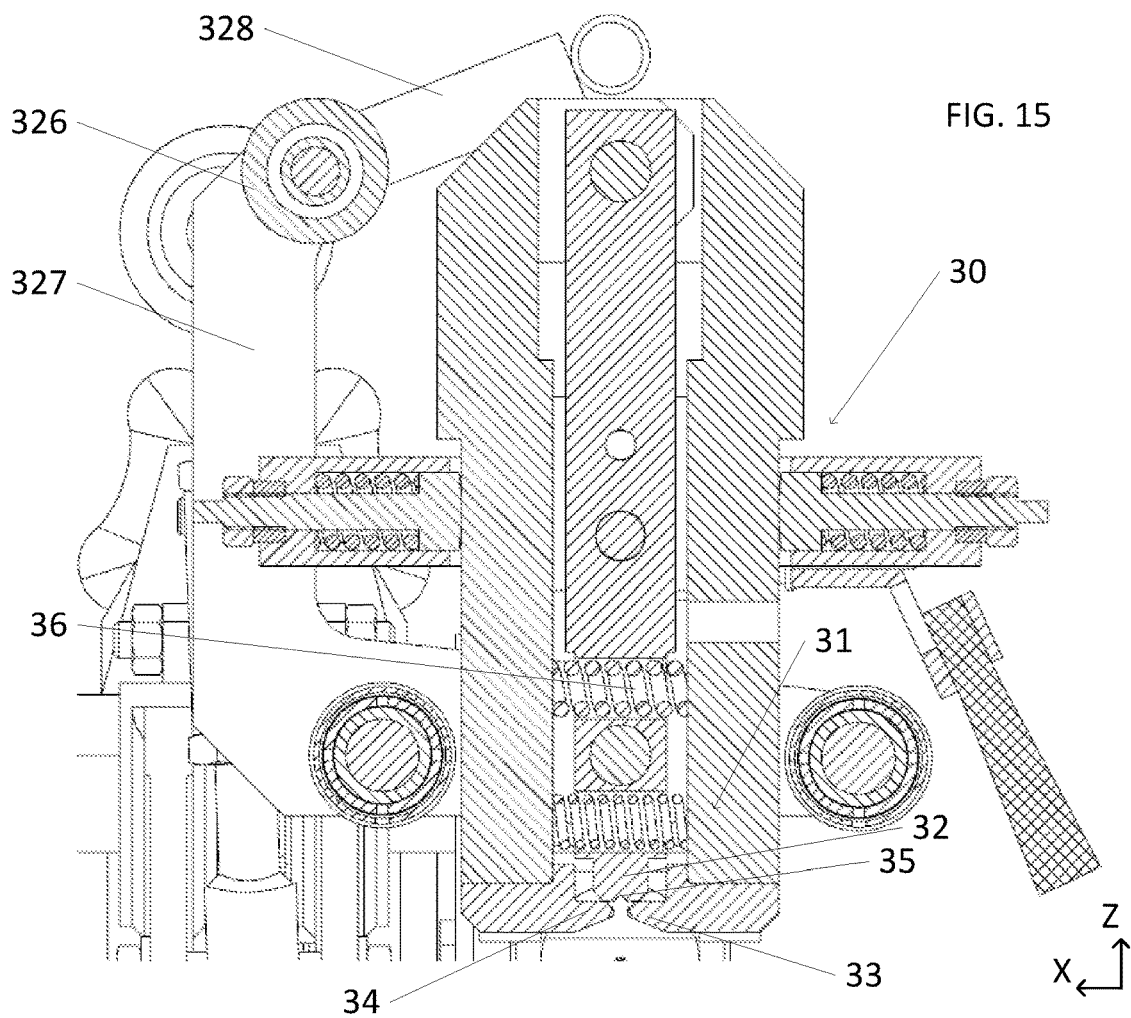
FIG. 15 illustrates in a sectional detail view from the side a sleeve crimper used by the installation from FIGS. 1 to 4.

As can be seen in FIGS. 15 and 16 in particular, the crimper 31 may include a plurality of jaws 32, 33, 34 comprising a bottom jaw 32 adapted to receive the bottom 12B of the sleeve preform 12, preferably in a rounded housing 35, and a first lateral jaw 33 and a second lateral jaw 34.

The first lateral jaw 33 and the second lateral jaw 34 are respectively adapted to interengage with the first lateral branch 12C and with the second lateral branch 12D of the sleeve preform 12 and to be moved toward one another transversely to the mid-line of the wire 4, so as to bend one toward the other, by plastic deformation, said first lateral branch 12C and said second lateral branch 12D of the sleeve preform 12, in order by closing up to envelop said sleeve preform 12 on the section of said wire 4 and thus to trap the end sections 5, 6 inside the sleeve 14.

The lateral jaws 33, 34 could have any shape and any kinematic chain allowing accentuation of the curvature, here of the concavity, of the sleeve preform 12 by plastic deformation against the wire 4 to obtain the finished sleeve 14.

In order to retain the sleeve preform 12 inside the crimper 31 until said crimper 31 is engaged on the wire 4 the lateral jaws 33, 34 could be spring-loaded toward one another by means of one or more suspension springs 36 and have non-return rims 37, 38 adapted to cooperate with the sleeve preform 12 by clipping action, as illustrated in FIG. 16.

The free edges of the lateral branches 12C, 12D of the sleeve preform 12 will preferably rest in a stable manner against said anti-return rims 37, 38, which will prevent said sleeve preform 12 falling out.

Of course, during the crimping operation, there will first be effected a closure of the crimper 31 by forced movement toward one another of the lateral jaws 33, 34 to bring about the crimping of the sleeve 14 and then, thereafter, once the sleeve 14 has actually been crimped onto the wire 4, opening of the crimper 31 by moving apart the lateral jaws 33, 34 by simple elastic return effect or by a forced motorized manoeuvre, in order to release the end sections 5, 6 now joined by said sleeve 14.

The forced movements of the lateral jaws 33, 34, in particular the closing movements, could be effected, where appropriate against the suspension spring 36, by any appropriate driving member, such as an actuator cylinder 24 or an electric motor.

In particular, in an analogous manner to what has been described for the cutter 21, the crimper 31 could be actuated by an actuator mechanism including a cam 325 rotated by a motorized actuator member 24 such as an actuator cylinder 24, which cam 325 cooperates with an actuator roller 326 carried by a crimping lever 327 that acts on the jaw 33, 34 concerned against a return spring 328 to close the crimper 31.

It will be noted that, in accordance with a preferred feature that may constitute a disclosure in its own right, the cutting tool 20 and the crimping tool 30 may share a common actuator mechanism and in particular the same actuator cylinder 24, which further improves the compactness of the installation 1.

Figure 4:
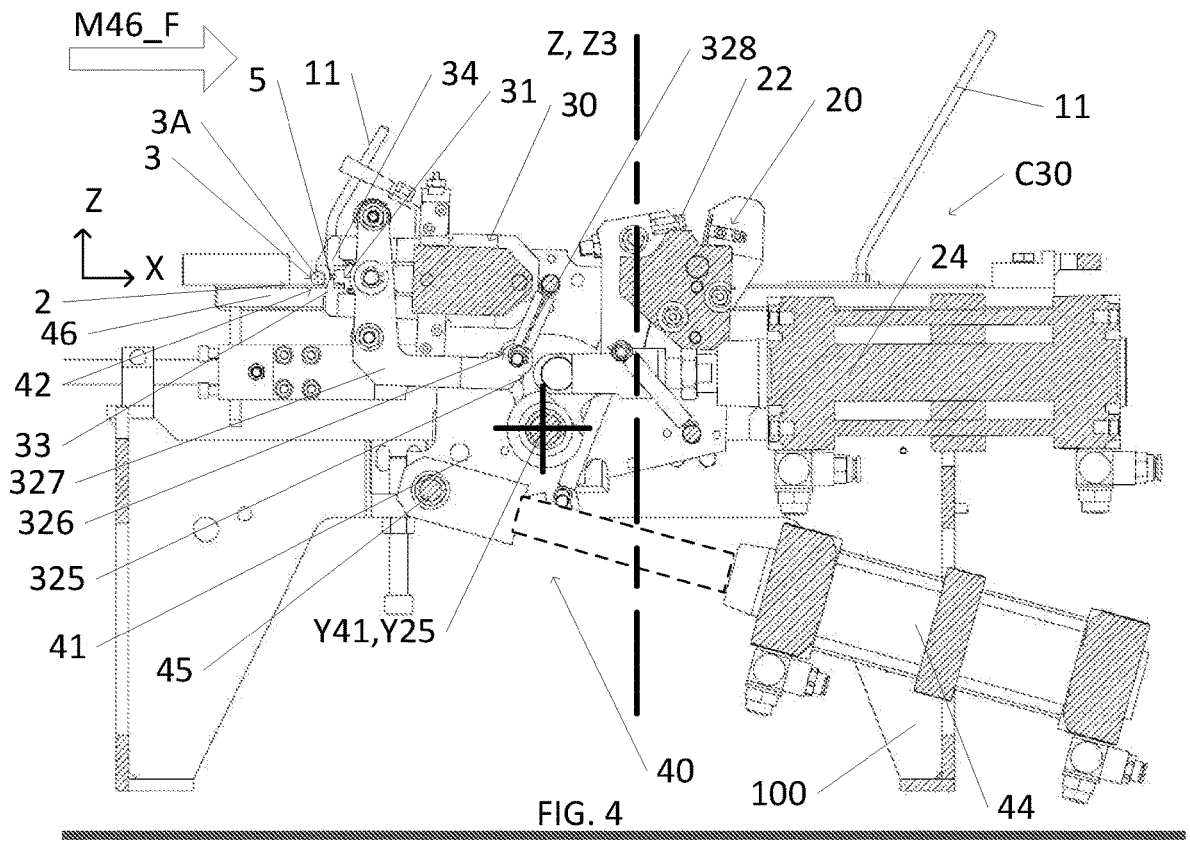
FIG. 4 illustrates in a sectional view from the side the switching head from FIGS. 2 and 3 pivoted into the crimping configuration, the crimping tool having replaced the cutting tool at the working location here.

In this regard, the cam 325 that controls the closing of the crimper 31 could advantageously be mounted on the same rotation axis Y25 as the cam 25 that commands the closing of the cutter 20, as can be seen in FIGS. 2 and 4. The two cams 25, 325 could even and preferably be constrained to rotate with one another on said rotation axis Y25.

In accordance with the disclosure, the installation 1 includes a configuration unit 40 that is adapted to cause said installation 1 to go automatically from a first working configuration, termed "cutting configuration" C20, corresponding to FIGS. 2, 11A and 11B, in which the receiving table 2 cooperates with the cutting tool 20 in such a manner as to position the braided torus 3 and the first and second end sections 5, 6 so that said first and second end sections 5, 6 are sectioned by the cutting tool 20, to a second working configuration, termed "crimping configuration" C30, distinct from the first working configuration C20, which corresponds to FIGS. 1, 4, 13A and 13B, and in which the receiving table 2 cooperates with the crimping tool 30 in such a manner as to position the braided torus 3 and the first and second end sections 5, 6 so that the crimping tool 30 joins said first and second end sections 5, 6 by means of the sleeve 14.

The configuration unit 40, preferably controlled by an electronic control system 43 that preferably also controls the actuation of the cutting tool 20 and the crimping tool 30, advantageously allows automatically chaining of the cutting operation and then the crimping operation on each braided torus 3, with no loss of the machine's reference point. The installation 1 is therefore able to carry out these operations in an autonomous manner, precisely, rapidly and perfectly reproducibly from one braided torus 3 to another.

The configuration unit 40 will in particular be capable of managing both the movements to position the receiving table 2 and therefore to position the braided torus 3 relative to the frame 100 and movements of the cutting tool 20 and then the crimping tool 30 relative to that same frame 100. The configuration unit will therefore allow fine and reproducible positioning of the receiving table 2 and therefore of the braided torus 3 relative to the cutting tool 20 and the crimping tool 30, in a tightly controlled frame of reference tied to the frame 100.

The configuration unit 40 will more particularly be adapted, in the cutting configuration C20, to move the braided torus 3 and more particularly the angular sector of said braided torus that contains the crossover point 13 of the first and second end sections 5, 6 to face the cutting tool 20 so that the first and second end sections 5, 6 are positioned in the cutter 21 and the two sets of blades 22, 23 are therefore located on either side of the crossover point 13 of said end sections 5, 6.

Likewise, the configuration unit 40 will be adapted, in the crimping configuration C30, to effect thereafter the necessary transfers relative to the frame 100, to move the braided torus 3 and more particularly the first and second end sections 5, 6 shortened by the cutting operation to face the crimping tool 30 in such a manner as to engage said end sections 5, 6 between the jaws 32, 33, 34 of the crimper 31 in the sleeve preform 12 present in said crimper 31.

As indicated above, the installation includes a frame 100 with which is associated a frame of reference termed "fixed frame of reference" (X, Y, Z).

In absolute terms, distributing the cutting tool 20 and the crimping tool 30 on the frame could be envisaged so as respectively to define a cutting location and a crimping location distinct from the cutting location to cause the configuration unit 40 automatically to move the braided torus 3 from one location to the other.

Figure 12B:
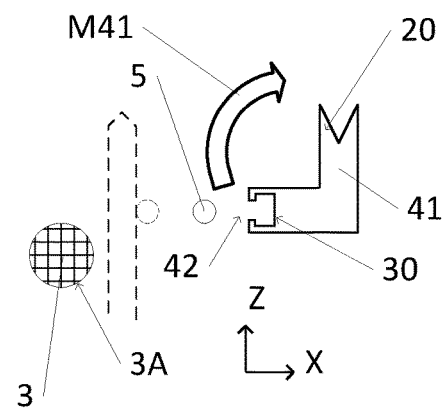
FIG. 12B is a diagrammatic sectional view from the side of the configuration from FIG. 12A.

However, as can be seen in FIGS. 3 and 12B, the configuration unit 40 preferably includes a switching head 41 that carries both the cutting tool 20 and the crimping tool 30 and that is adapted to be able to position alternately, by a first movement M41 termed "switching movement" effected relative to the frame 100, said cutting tool 20, for the cutting configuration C20, and respectively said crimping tool 30, for the crimping configuration C30, facing a same predetermined common working location 42 in the fixed frame of reference (X, Y, Z) of the installation 1.

For the braided torus 3 the cutting location and the crimping location are therefore identical and correspond to the single working location 42 at which, thanks to the switching movement 41, the cutting tool 20 and then the crimping tool 30 are successively present.

The use of a switching head 41 in particular allows significant reduction of the overall size of the installation 1 and the cycle time necessary to go from the cutting configuration C20 to the crimping configuration 30 (then, conversely, returning from the crimping configuration 30 to the cutting configuration C20).

Moreover, as will emerge hereinafter, this kind of switching head 41 allows the change of configuration to be effected by means of a combination of simple and well-controlled movements, of moderate amplitude and inertia that can be guided with precision, thereby limiting the sources of errors linked to mechanical clearances, and preserving common referencing in the fixed frame of reference of the frame 100. This improves the installation in terms of precision, reliability and compactness.

As can be seen in FIG. 3, the switching movement M41 is preferably effected by pivoting the switching head 41 about a pivot axis Y41 that is parallel to the reference plane (X, Y), here horizontal, of the frame 100.

More particularly, said pivot axis 41 will be parallel to the ordinate axis Y and preferably situated below the plane of the receiving table 2.

The use of a pivoting switching head 41 advantageously allows the switching movement 41 to be performed in a relatively small space and in a particularly simple manner.

The switching movement M41 will preferably correspond to a quarter-turn.

End of travel stops could of course be used to index the two positions that respectively correspond to the cutting configuration C20 and to the crimping configuration C30.

The switching head 41 could advantageously have a substantially L-shaped arrangement, one of the branches of the L carrying the cutting tool 20 and the other branch carrying the crimping tool 30.

This orthogonal disposition of the tools 20, 30 will be perfectly suitable for a quarter-turn switching movement M41 and will moreover allow downward disengagement of the crimper 31, under the plane of the braided torus 3 and under the receiving table 2, to facilitate supplying said crimper 30 with a new sleeve preform 12, in concurrent time between two crimping operations effected on two successive braided toruses 3.

The switching movement M41 could be produced by any appropriate driving member, for example by a switching cylinder 44, as illustrated in FIGS. 2 to 4. Said switching cylinder 44 will preferably be distinct from the actuator cylinder 24 for actuating the closure of the cutter 21, respectively the crimper 31.

The rod of said switching cylinder 44 could preferably be articulated by means of a crank pin 45 on a portion of the switching head 41 that forms a crank with respect to the pivot axis Y41.

In accordance with a preferred feature that may constitute a disclosure in its own right, the installation 1 may include a shared actuator mechanism 24, 25, 325, here driven by the same actuator cylinder 24, said actuator mechanism being adapted selectively to control, according to whether the installation 1 is in the cutting configuration C20 or to the contrary in the crimping configuration C30, either to actuate the cutting tool 20, here the cutter 21, to close it or, respectively, to actuate the crimping tool 30, here the crimper 30, to close it.

A single actuator mechanism could therefore advantageously be used for each of these cutting and then crimping operations.

The switching movement M41 of the switching head 41 will advantageously allow not only appropriate positioning of the tool 20, 30 facing the braided torus 3 and of the end sections 5, 6 but consequently also selectively to associate said tool 20, 30 with the actuator mechanism.

In this regard, the rotation axis Y25 of the cams, common to the cam 25 for closing the cutter 21 and to the cam 325 for closing the crimper 31, will preferably coincide with the pivot axis Y41 of the switching head.

The position of said rotation axis Y25 of the cams will therefore be invariant during the switching movement M41 so that the same actuator cylinder 24 could be used to drive the various cams 25, 325 forming the same subassembly of cams 25, 325, constrained to rotate together.

The cutting lever 27 and the crimping lever 327 and their respective rollers 26, 326 will be arranged on the switching head 41 in such a manner that they can be presented alternately facing the cams 25, 325 according to the chosen configuration C20, C30.

In the cutting configuration C20 the rotary movement of the subassembly of cams 25, 325 driven by the actuator cylinder 24 will therefore be transmitted to the roller 26 associated with the cutter 21 via the cam 25 to close the cutter but will have no effect on the crimper 31 because the corresponding cam 325 turns idly without being able to interfere with the roller 326 associated with the crimper 31.

Conversely, in the crimping configuration C30 the rotary movement of the subassembly of cams 25, 325 driven by the actuator cylinder 24 will be transmitted to the roller 326 associated with the crimper 31 via the cam 325 but will have no effect on the cutter 21.

The installation 1 therefore has optimized and particularly compact kinematics.

The configuration unit 40 preferably includes a carriage 46 that carries the receiving table 2 and is mounted to be mobile in a second movement, termed "engagement/disengagement movement" M46, distinct from the switching movement M41, which alternately allows i/ to bring the braided torus 3 to the common working location 42 to enable the interaction between the braided torus 3 and the cutting tool 20 in the cutting configuration C20, respectively the interaction between the braided torus 3 and the crimping tool 30 in the crimping configuration C30, and ii/ to move the braided torus 3 away from said common working location 42 when the switching head 41 has to effect the switching movement M41.

The receiving table 2 is therefore advantageously retractable in order to free up the space necessary for the switching movement M41 and thus to prevent the receiving table 2 and the braided torus 3 from interfering with the switching head 41 when the latter pivots.

The carriage 46 and the switching head will to this end follow distinct trajectories, allowing their respective to-and-fro movements M41, M46 during phases of reconfiguring the installation 1.

One could therefore go easily from one configuration C20 to the other configuration 30, and vice versa, by a combination of separate and coordinated movements M41, M46 that are relatively simple, easy to guide and able to be effected within a compact volume.

The engagement/disengagement movement M46 is preferably a movement in translation parallel to the reference plane (X, Y) of the frame 100 and more preferably parallel to the abscissa axis X.

The carriage therefore and preferably moves transversely to the reference axis Z and therefore transversely to the axis Z3 of the braided torus 3, which preferably allows the braided torus to move toward the working location 42 by a centrifugal advance movement M46_F and to move away from it by a centrifugal withdrawal movement M46_R.

Here again, this horizontal translation movement M46 would be able to be guided in a precise and reliable manner.

Of course, the configuration unit 40 could to this end be provided with all the appropriate guiding and driving members controlled by the control system 43.

The switching head 41 is preferably disposed inside the perimeter of the braided torus 3.

When the braided torus 3 is in place on the receiving table 2, and the configuration is either the cutting configuration C20 or the crimping configuration C30, or in any intermediate transition configuration, the switching head 41 is therefore and advantageously contained in a cylindrical envelope that is centered on the central axis Z3 and delimited radially by the radially internal face of the braided torus 3.

This kind of arrangement advantageously favours the compactness of the installation 1.

This kind of arrangement further favours access of the cutter 21 and of the crimper 31 to the end sections 5, 6 by radially inward, substantially horizontal, approach in the plane of the braided torus 3.

This kind of arrangement moreover allows other members of the installation 1, notably members for driving the carriage 46 or members for driving spreader members (as described in detail hereinafter) to be disposed outside the perimeter of the braided torus 3. All the space available within the installation 1 can therefore and advantageously be used.

Moreover, the configuration unit 40 preferably includes spreader members 51, 52, 53, 54 adapted to engage the first and second end sections 5, 6 in order to cause said first and second end sections 5, 6 to project relative to the body 3A of the braided torus formed by the helicoidal turns 7, thereby forming a passage between said end sections 5, 6 and the body 3A of the braided torus 3, in such a manner as to render said first and second end sections 5, 6 accessible to the cutting tool 20, respectively to the crimping tool 30.

Causing the end sections 5, 6 to project advantageously allows said end sections 5, 6 to be moved away from the surface of the body 3A of the braided torus formed by the superposed helicoidal turns 7 and more particularly to lift said end sections 5, 6 from the surface of said body 3A of the braided torus against which said end sections 5, 6 initially rest, and this sufficiently to allow the cutting tool 20 and the crimping tool 30 to distinguish the end sections 5, 6 from the rest of the braided torus 3 and thus to act exclusively on said end sections 5, 6.

The bending of the end sections 5, 6 caused by the action of the spreader members 51, 52, 53, 54 will preferably be strictly elastic in that the stresses generated by this action in the braid wire 4 will not exceed the yield strength at 0.2% extension, usually denoted "Rp0.2", of the material constituting the braid wire 4, and in such a manner as not to cause permanent deformation of the end sections 5, 6 and thus to allow elastic return of said end sections 5, 6 and of the sleeve 14 against the body 3A of the braided torus after the crimping operation, as can be seen in FIG. 5.

It will also be noted that causing the end sections 5, 6 to project simultaneously is advantageously effected in such a manner that the first end section 5 and the second end section 6 cross at a crossover point 13 that is therefore offset at a distance from the body of the braided torus 3A because of the elastic flexing of the end sections 5, 6 because of the action of the spreader members.

More preferably, the end sections 5, 6 will preferably be bent by the spreader members 51, 52, 53, 54 so as to project toward the interior of the torus 3, that is to say toward the central axis Z3, so that, in a projection plane normal to the central axis Z3 and/or in the reference plane (X, Y), the crossover point 13 that results from causing them to project will be radially nearer said central axis Z3 than the radially internal surface of the body of the braided torus 3A formed by the helicoidal turns 7 is.

This choice notably allows the sleeve 14 thereafter to be disposed on the radially internal face of the braided torus 3, as can be seen in particular in FIG. 5, which prevents the sleeve 14 in operation causing premature wear by abrasion of the reinforcement plies of the pneumatic tire and more particularly of the carcass ply of said pneumatic tire.

In practice, the cutting operation and then the crimping operation must be effected in an angular sector considered in azimuth around the central axis Z3 and more globally around the vertical reference axis Z that contains the crossover point 13 and that is preferably substantially or even exactly centered on the crossover point 13.

Figure 13A:
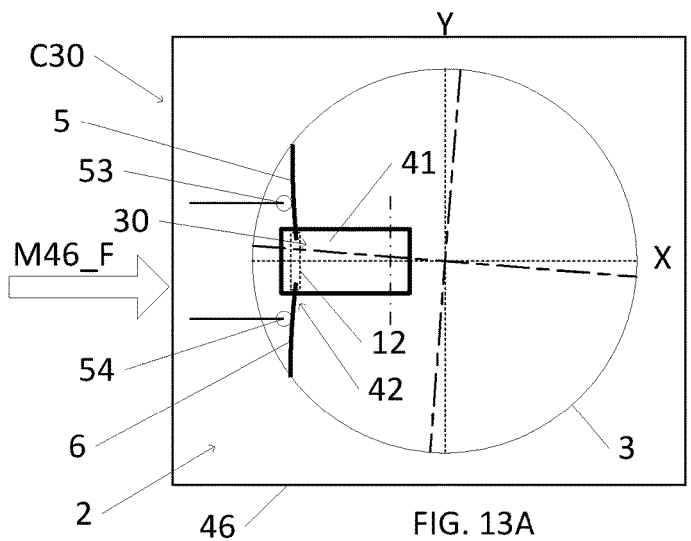
FIG. 13A illustrates in a diagrammatic view from above an operation of crimping the sleeve onto the first and second end sections while the receiving table has executed a second engagement movement to engage said first and second end sections in the crimping tool and, to this end, said first and second end sections are still supported by the retaining fingers forming the spreader members of the second set.

The working location 42 common to the cutting tool 20 and to the crimping tool 30, the switching movement M41 of the switching head 41, and the trajectory of the carriage 46 allowing the receiving table 2 to perform its movements of engagement M46_F and of disengagement M46_R, will therefore be defined in such a manner as to position the crossover point 13 of the end sections 5, 6 inside said working location 42 and more particularly in such a manner as successively to position the crossover point 13 inside the cutter 21 (FIG. 11A) and then inside the crimper 31 (FIG. 13A).

The spreader members 51, 52, 53, 54 preferably include retaining fingers 53, 54 on the carriage 46 so as to be able to retain the first and second end sections 5, 6 in position projecting relative to the body 3A of the braided torus 3 both in the working configurations C20, C30 and during the engagement/disengagement movements M46.

A projecting configuration of the end sections 5, 6 could therefore advantageously be defined that could be substantially preserved and therefore used as a reference both for the cutting operation and for the subsequent crimping operation.

It will be noted that the installation 1 preferably includes two sets of spreader members.

A first set of spreader members 51, 52 includes paddles 51, 52, that allow the end sections 5, 6 initially to project relative to the body 3A of the braided torus 3 (FIGS. 7A, 7B) and said end sections 5, 6 to continue to project while the receiving table 2 effects an azimuth rotation movement R2 about the reference axis Z (or, which is substantially equivalent, about the central axis Z3), in order to orient the braided torus 3 in azimuth relative to the working location 42.

This rotation movement R2 in azimuth will more particularly allow a reference to be taken by detecting the passage of one of the projecting end sections 5, 6 by a reference point O60 associated with the frame 100 by means of an appropriate sensor 60, such as an optical sensor 60 the beam of which materializes the reference point O60, as illustrated in FIG. 8A.

The paddles 51, 52 will obviously be such that each of them is able to slide between the body of the braided torus 3 and the end section 5, 6 that is assigned to them in order to capture said end section 5, 6 (FIGS. 7A, 7B) and to be able to guide the sliding of said end section 5, 6 on said paddles 51, 52 during the rotation R2 in azimuth without allowing said end section 5, 6 to escape (FIGS. 8A, 8B).

The paddles 51, 52 will preferably be on the carriage 46 and mounted to be mobile in translation relative to the receiving table 2 parallel to the reference plane (X, Y) and more preferably parallel to the abscissa axis X so as to be able to engage the first and second end sections 5, 6 by centripetal lateral approach.

The retaining fingers 53, 54 will preferably form a second set of spreader members that will be substituted for the paddles 51, 52 in order to hold the end sections 5, 6 in a position projecting relative to the body of the braided torus 3 by providing for said end sections 5, 6 supports that are closer to the crossover point 13 than the supports provided by the paddles 51, 52 were and that advantageously remain during and after the cutting operation, as far as the crimping operation.

The retaining fingers 53, 54 will advantageously further occupy a smaller space than the paddles 51, 52, which will facilitate access of the cutting tool 20 and then the crimping 30 to the first and second end sections 5, 6.

The retaining fingers will preferably be mobile with at least one component of movement parallel to the vertical axis Z and therefore preferably substantially parallel to the central axis Z3 of the braided torus 3, which will allow said retaining fingers 53, 54 to cross the plane of the torus and to engage the end sections 5, 6 by being inserted, by a movement of axial penetration, into the space between the paddles 51, 52, between the body 3A of the braided torus and the crossover point 13, such that said space has been opened up by the paddles 51, 52 as is illustrated in FIGS. 9A and 9B.

Once each of the retaining fingers 53, 54 has engaged its respective end section 5, 6, the paddles 51, 52, which are advantageously retractable, will preferably be withdrawn automatically, here in centrifugal translation relative to the central axis Z3, by a retraction movement parallel to the abscissa axis X.

The retaining fingers will preferably be carried by arms 55, 56 that could preferably be mounted to rotate in yaw about yaw axes parallel to the vertical axis Z so as to be able, after the engagement of the retaining fingers 53, 54 in contact with the end sections 5, 6, to deploy the retaining fingers 53, 54 through an angular opening in yaw, as illustrated in FIG. 10A.

This movement of deployment in yaw moves the retaining fingers 53, 54 away from one another and each is moved away from the crossover point 13, whilst remaining in contact with and sliding along their respective end section 5, 6 so as to rise along said end section toward the portion of the wire 4 that attaches said end section 5, 6 to the braided torus 3.

In so doing, the retaining fingers 53, 54, whilst maintaining, or even accentuating, the bending of said end sections 5, 6 and therefore the projecting nature of the latter, advantageously clear a free space in an angular sector of the torus 3 that contains the crossover point 13, which allows and favours the access of the cutting tool 20 and then the crimping tool 30 to the end sections 5, 6 in the vicinity of said crossover point 13.

As can be seen in FIG. 17, the braided torus 3 extends axially between a first imaginary plane, termed "first base plane" P1, transverse to the central axis Z3 and tangential to a first face of said braided torus 3, and a second imaginary plane, termed "second base plane" P2, transverse to the central axis Z3 and tangential to a second face of the braided torus 3 axially opposite the first face relative to the generatrix line L8 of the braided torus.

For convenience of geometrical description, the first and second base planes P1, P2 could be considered normal to the central axis Z3.

Figure 18:
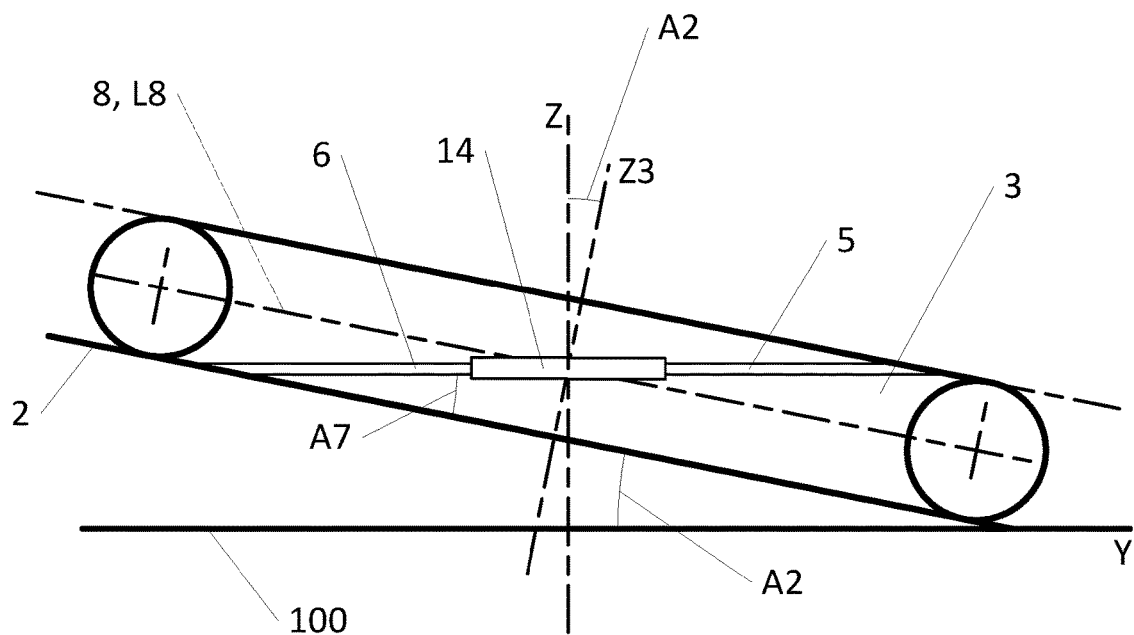
FIG. 18 illustrates in a diagrammatic view the principle of inclining the receiving table at a pitch angle opposite the helix angle of the helicoidal turns of the braided torus so as to present the end sections substantially horizontally in the cutting tool and then in the crimping tool.

In accordance with a preferred feature that may constitute a disclosure in its own right, applicable to any installation for sleeving a braided torus 3, the receiving table 2, where applicable the cutting tool 20 if it is integrated into the installation, and the crimping tool 30 are arranged in such a manner as to place the sleeve 14 systematically on the radial internal face of the braided torus 3, oriented toward the central axis Z3, in a space that is strictly confined axially between the first base plane P1 and the second base plane P2, and radially contained inside the generatrix line L8 of the braided torus 3, that is to say situated at a radial distance from the central axis Z3 less than the radius R8 of said generatrix line L8, as can be seen in FIGS. 5, 17 and 18.

In this regard, following the braiding operation, on the one hand the end sections 5, 6 initially cross at a crossover point 13 situated inside the perimeter of the braided torus 3, on the same side as the radially internal face of said braided torus, and on the other hand the cutting operation is effected from the interior of the braided torus, in an angular sector of the torus that contains said crossover point 13 and that is preferably centered on said crossover point so as to shorten the first and second end sections on either side of said crossover point 13 in order to interrupt each end section 5, 6 before it reaches said crossover point, and then the sleeve 14 is finally placed in this same angular sector to form a bridge between the first and second end sections substantially at the location where the crossover point 13 was located.

It will be noted that a feature of this kind relating to the positioning of the sleeve 14 on the radially internal surface of the braided torus 3 is applicable to any installation for manufacturing bead wires 9 including at least one receiving table 2 and one crimping tool 30 or more globally applicable to any crimping installation using a crimping tool 30 enabling a sleeve 14 to be crimped to join said two end sections 5, 6 of a wire 4 closed on itself inside a braided torus 3 in order to provide the cohesion of said braided torus 3.

In all cases, by placing the sleeve 14 exclusively on the radially internal face of the braided torus, without said sleeve overshooting or projecting axially from the flanks of the braided torus or projecting radially outwards on the radially external face of the braided torus, and more particularly projecting radially outwards on the external equatorial line of said braided torus, it is advantageously certain that, once the bead wire 9 has been integrated into the pneumatic tire, the sleeve 14 does not injure or damage by abrasion the structural and reinforcement elements of the casing of said pneumatic tire, such as the carcass ply of said tire.

This therefore improves the quality and the robustness of said pneumatic tire.

Of course, placing the sleeve 14 on the braided torus 3 by inward radial approach is facilitated by placing the cutting tool 20 and the crimping tool 30 inside the perimeter delimited by the braided torus 3 as indicated hereinabove and more particularly by providing a pivoting switching head 41 that is situated inside said braided torus 3 and that moves the cutter and crimper 21, 31 of said tools 20, 30 open and facing the radially internal face of said braided torus 3, in a horizontal plane (X, Y) substantially or even exactly normal to the central axis Z3 of the braided torus 3.

By way of illustration, the length of the sleeve 14 could be between 15 mm and 50 mm inclusive, preferably between 20 mm and 40 mm inclusive, and for example between 22 mm and 30 mm inclusive.

The crimping tool 30 comprising, as stated above, a crimper 31 that is adapted to receive a sleeve preform 12 that is split over all its length and that has a U-shaped concave curved cross section comprising a rounded bottom 12B and two flared lateral branches 12C, 12D, said crimper 31 is preferably adapted to form the sleeve 14 by pressing the bottom 12B of the sleeve preform 12 against the cross section of the first and second end sections 5, 6 placed to project from the body of the braided torus 3, preferably by centrifugal radial approach relative to the central axis Z3 of the braided torus, and thereafter by bending in plastic deformation, by means of a first lateral jaw 33 and a second lateral jaw 34, the lateral branches 12C, 12D of said sleeve preform 12 around said cross section, through the passage created by the spreader members 53, 54 between the body 3A of the braided torus 3 and said first and second end sections 5, 6, so as to envelop said cross section, as illustrated in dashed line in FIG. 16.

It is therefore advantageously possible to attach the end sections 5, 6 without affecting the rest of the braided torus 3 by incorporating in the sleeve 14 a single unitary section of the braid wire 4 without creating an extra thickness of material that would occupy all the circumference of the section of the braided torus 3 and more globally of the bead wire 9, and that could thus be potentially prejudicial to the service life or to the performance of the pneumatic tire.

Moreover, when the installation 1 is in the cutting configuration C20, the crimper 31 is preferably in a reloading position, here substantially vertical and with the jaw at the bottom as illustrated in FIGS. 2 and 15, in which reloading position a reloading tool (schematically shown in FIG. 20) comes to place a new sleeve preform 12 in said crimper 31.

To this end the lateral jaws 33, 34 are preferably each provided with an anti-return retaining rim 37, 38 and associated with an elastic suspension member 36, such as a spring 36, in such a manner as to be able to cooperate clipping fashion with the lateral branches 12C, 12D of said sleeve preform 12 and thereby to prevent said sleeve preform 12 falling out of the crimper 31 on going from the cutting configuration C20 to the crimping configuration C30 and more particularly during the pivoting movement M41 of the switching head 41.

The crimper 31 can therefore advantageously be reloaded in concurrent time and in a small space, in particular if the choice is made to produce the sleeve preform 12 on demand, on each crimping cycle, by bending a continuous metal strip into a U shape and cutting it to the length of the required sleeve.

In accordance with a preferred feature that may constitute a disclosure in its own right, the receiving table 2 has relative to the reference plane (X, Y) of the frame 100 an inclination, termed "compensation inclination", at a non-zero pitch angle A2 the value of which corresponds to the helix angle A7 of the helicoidal turns 7 of the braided torus 3, as can be seen in FIG. 18, so that said receiving table 2 offers up the first and second end sections 5, 6 facing the cutting tool 20 and then facing the crimping tool 30 in an orientation that is parallel to the reference plane (X, Y) of the frame.

In practice the pitch angle A2 corresponds to the angle at which the plane guiding the receiving table 2, and containing the generatrix line L8, is inclined relative to the reference plane (X, Y), here horizontal, of the frame 100.

The pitch angle A2 will preferably have the same absolute value as the helix angle A7 and the opposite sign to the latter, so as to compensate the inclination of the braid wire 4 created relative to the generatrix line L8 by said helix angle A7.

Thus it would advantageously be possible to align perfectly, here horizontally, the end sections 5, 6 with the respective slots of the cutter 21 and the crimper 31 into which said end sections 5, 6 have to be introduced, which will in particular prevent incorrect insertion of one of the end sections 5, 6 in either the cutting tool 20 or the crimping tool 30 or accidental ejection of the sleeve preform 12 out of the crimper 31 during said insertion of the end sections 5, 6.

Thus there will be provided as intended a very precise sequential cutting operation, one end section after the other, followed by homogeneous crimping of the sleeve 14. This will therefore improve the quality and the reliability of the production of bead wires 9.

Of course, the disclosure also concerns a method employing one and/or the other of the steps described above.

Referring to the figures, said method may in particular comprise the following sequence of steps or a part of that sequence of steps, advantageously controlled automatically by the control system 43.

A braided torus 3 being placed on the receiving table 2, the paddles 51, 52 are advanced to cause the end sections 5, 6 to project (FIGS. 7A, 7B).

The receiving table 2 then causes the braided sleeve 3 and its projecting end sections 5, 6 to turn, here in rotation in azimuth in the clockwise direction, by means of a roller/pinch roller motorized assembly 10, until the passage of one of said end sections 6 past the reference point O60 defined relative to the frame 100 by the sensor 60 is detected (FIG. 8A).

Once this referencing has been done, and therefore once the presence and the orientation in azimuth of the braided torus 3 relative to the frame 100 are known, the receiving table 2 adjusts the orientation in azimuth of said braided torus 3 by a rotation about the vertical axis, which preferably is substantially coincident with the central axis Z3 of said braided torus 3, within the pitch angle A2. As a result, the receiving table 2 places the angular sector of the braided torus 3 containing the crossover point 13 of the end sections 5, 6 angularly facing the working location 42 (FIG. 8A).

The switching head 41 is placed so as to present the cutter 21 facing the working location 42, and to be more precise in that working location 42.

The retaining fingers 53, 54 are then engaged in contact with the end sections 5, 6 (FIGS. 9A, 9B), the paddles 51, 52 retracted, and then the retaining fingers deployed (FIGS. 10A, 10B).

The carriage 46 then moves the braided torus 3 toward the working location 42 and the cutting tool 20 by a movement in translation transverse to the reference axis Z, in such a manner as to place the two projecting end sections 5, 6 in the cutter 21, the crossover point 13 being located between the two sets of blades 22, 23 (FIGS. 2, 11A, 11B).

The actuator cylinder 24 then pivots the cams 25 in order to actuate successively the levers 27 each associated with a set of blades 22, 23 so as to sequentially section one end section 5 and then the other one 6, thus clearing a void between said end sections 5, 6 where the crossover point 13 was located before cutting (FIG. 11A).

The carriage 46 then manoeuvres the receiving table 2 and the braided torus 3 to retract them, the shortened end sections of which braided torus are still projecting, held by the retaining fingers 53, 54, in order to extract said end sections 5, 6 from the cutter 21 and to allow the switching cylinder 44 to pivot the switching head 41, here in the clockwise direction in FIGS. 3 and 4, to move the cutter 21 away and to substitute the crimper 31 for the latter at the working location 42 (FIGS. 3, 4, 12A, 12B).

Figure 13B:
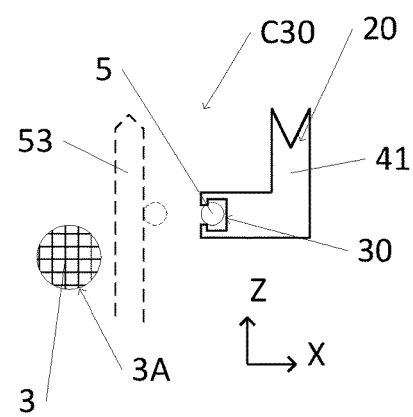
FIG. 13B is a diagrammatic sectional view from the side of the configuration from FIG. 13A.

The carriage 46 then moves the receiving table 2 and the braided torus 3 forward again, the shortened projecting end sections 5, 6 of which braided torus are then held by the retaining fingers 53, 54, until returning to the working location 42 that it had previously quit, so as to insert the end sections 5, 6 between the jaws of the crimper 31, in the hollow space of the sleeve preform 12 (FIGS. 13A, 13B).

Figure 14:
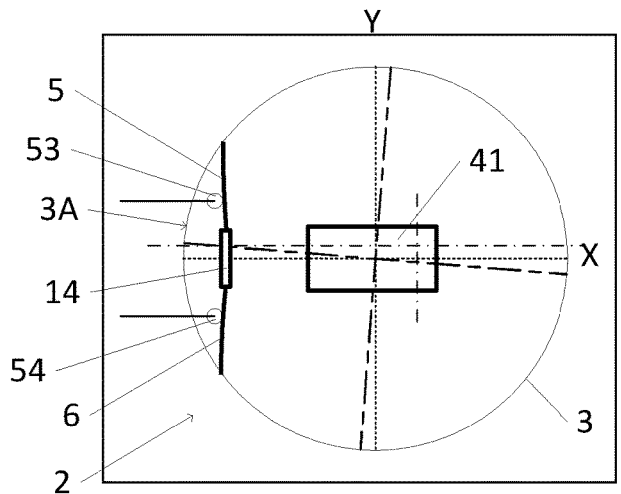
FIG. 14 illustrates in a diagrammatic view from above the disengagement from the crimping tool of the braided torus and more particularly of the braid wire equipped with its sleeve, which can in particular enable an operation to check the presence of the sleeve by an appropriate sensor, in particular an optical sensor.

The actuator cylinder 24 then pivots the cam 325 in order to activate the lever 327 that drives the movement toward one another of the crimping jaws 33, 34 in order to close the sleeve preform 12 plastically onto the end sections 5, 6, thus filling in by a bridge the void previously left by the cutting tool 20 (FIGS. 13A, 13B, 14).

One the sleeve 14 has been crimped, there may follow a step of checking the presence of said sleeve, for example by means of an optical sensor, while the end sections 5, 6 are still held at a distance from the body 3A of the braided torus 3 by the retaining fingers 53, 54 (FIG. 14).

Finally, the retaining fingers 53, 54 are withdrawn so as to free the end sections 5, 6 attached by the sleeve 14, which therefore return to being pressed against the radially internal face of the braided torus 3 by simple elastic return (FIG. 5). This produces a finished bead wire 9.

The switching head 41 pivots in the opposite direction (here anticlockwise with reference to FIGS. 2 to 4) so as to come to replace the cutter 21 at the working location 42 and simultaneously to allow the loading of a new sleeve preform 12 into the crimper 31.

The control system 43 associated with the systems driving the various movements will advantageously allow automatic chaining of those various steps and in particular chaining at the same working location 42 of the cutting operation and then the crimping operation.

Of course, the disclosure is in no way limited to only the variant embodiments described above, the person skilled in the art being in particular in a position freely to isolate or to combine with one another the aforementioned features or to substitute equivalents for them.

What is claimed is:

1. An installation for manufacturing a bead wire intended to reinforce a tire, said installation including:
   a receiving table that is adapted to receive a braided torus that includes at least one wire, termed "braid wire", which at least one braid wire extends longitudinally from a first end section to a second end section and is interlaced in helicoidal turns around and along a generatrix line that forms a ring around a principal axis that corresponds to the central axis of said braided torus,
   a cutting tool adapted to section the first end section and the second end section in order to adjust the length of said first and second end sections,
   a crimping tool adapted to crimp a sleeve around said first end section and said second end section in order to join and to fix said first and second end sections to one another, and
   a configuration unit that is adapted to cause said installation to pass automatically from (i) a first working configuration, termed "cutting configuration", in which the receiving table cooperates with the cutting tool in such a manner as to position the braided torus and the first and second end sections so that said first and second end sections are sectioned by the cutting tool, to (ii) a second working configuration, termed "crimping configuration", distinct from the first working configuration, in which the receiving table cooperates with the crimping tool in such a manner as to position the braided torus and the first and second end sections so that the crimping tool joins said first and second end sections by means of the sleeve.

2. The installation according to claim 1,
   wherein the braided torus extends axially between (i) a first imaginary plane, termed "first base plane", which first base plane is transverse to the central axis and tangential to a first face of said braided torus, and (ii) a second imaginary plane, termed "second base plane", which second base plane is transverse to the central axis and tangential to a second face of the braided torus situated axially opposite the first face relative to the generatrix line, and
   wherein the receiving table, the cutting tool and the crimping tool are adapted systematically to place the sleeve on the radially internal face of the braided torus, in a space that is contained axially between the first base plane and the second base plane, and that is radially contained inside the generatrix line of the braided torus.

3. The installation according to claim 1,
   wherein the installation includes a frame that geometrically defines a frame of reference, termed "fixed frame of reference", comprising a horizontal reference plane and a vertical reference axis that is normal to the reference plane, and
   wherein the configuration unit includes a switching head that carries both the cutting tool and the crimping tool and that is adapted to be able alternately to position, by a first movement termed "switching movement" effected relative to said frame, said cutting tool for the cutting configuration and respectively said crimping tool for the crimping configuration, and
   wherein when the cutting tool is in the cutting configuration, the cutting tool performs the cutting at a predetermined working location, and when the crimping tool is in the crimping configuration, the crimping tool performs the crimping at the same predetermined common working location in the fixed frame of reference.

4. The installation according to claim 3 wherein the switching movement is effected by pivoting the switching head about a pivot axis that is parallel to the reference plane of the frame.

5. The installation according to claim 3 wherein said installation includes a shared actuator mechanism driven by a common actuator cylinder, said actuator mechanism being adapted selectively, according to whether the installation is in the cutting configuration or to the contrary in the crimping configuration, to drive either actuation of the cutting tool to close the cutting tool or, respectively, actuation of the crimping tool to close the crimping tool.

6. The installation according to claim 3 wherein the configuration unit includes a carriage that carries the receiving table and is mounted to be mobile in a second movement, termed "engagement/disengagement movement", distinct from the switching movement, that alternately allows: (i) the braided torus to be moved to the common working location to allow the interaction between the braided torus and the cutting tool in the cutting configuration, respectively the interaction between the braided torus and the crimping tool in the crimping configuration, and (ii) the braided torus to be moved away from said common working location when the switching head has to effect the switching movement.

7. The installation according to claim 6 wherein the engagement/disengagement movement is effected in translation parallel to the reference plane of the frame.

8. The installation according to claim 6,
wherein the configuration unit includes spreader members adapted to engage the first and second end sections in order to cause said end sections to project relative to a body of the braided torus formed by the helicoidal turns, and
wherein the spreader members comprise retaining fingers on the carriage so as to be able to hold the first and second end sections in a position projecting relative to the body of the braided torus both (i) when the installation is in the working configurations and (ii) during the engagement/disengagement movement.

9. The installation according to claim 3 wherein the switching head is disposed inside a perimeter of the braided torus.

10. The installation according to claim 3, wherein the receiving table has, relative to the reference plane of the frame, an inclination, termed "compensation inclination", at a non-zero pitch angle the value of which corresponds to the helix angle of the helicoidal turns of the braided torus so that said receiving table presents the first and second end sections to the cutting tool and to the crimping tool in an orientation that is parallel to the reference plane of the frame.

11. The installation according to claim 1 wherein the configuration unit includes spreader members adapted to engage the first and second end sections in order to cause said end sections to project relative to a body of the braided torus formed by the helicoidal turns, thus forming a passage between said end sections and the body of the braided torus so as to render said first and second end sections accessible to the cutting tool, respectively to the crimping tool.

12. The installation according to claim 11,
wherein the crimping tool includes a crimper that is adapted to receive a sleeve preform, which sleeve preform is slit over all its length so that the sleeve preform has a U-shape concave curved cross section comprising a rounded bottom and two flared lateral branches, and
wherein the crimper is adapted to form the sleeve by pressing the bottom of the sleeve preform against the cross sections of the first and second end sections projecting from the body of the braided torus, and then by bending in plastic deformation, by means of a first lateral jaw and a second lateral jaw, the lateral branches of said sleeve preform around said cross section through the passage created by the spreader members so as to envelop said cross section.

13. The installation according to claim 12,
wherein, when said installation is in the cutting configuration, the crimper is located in a reloading position in which a reloading tool comes to place a new sleeve preform in said crimper,
wherein the lateral jaws are each provided with a respective retaining rim, and
wherein an elastic suspension member is provided in association with the lateral jaws such that the lateral jaws are able to cooperate with the lateral branches of said sleeve preform in a manner so as to prevent said sleeve preform falling out of the crimper during the passage of the installation from the cutting configuration to the crimping configuration.

14. The installation according to claim 13, wherein the elastic suspension member comprises a spring.

15. The installation according to claim 1,
wherein the cutting tool includes a cutter with differential action, and
wherein the cutter includes a first set of blades for cutting the first end section and a second set of blades for cutting the second end section, the second set of blades being adapted to come into action after the first set of blades has finished cutting the first end section.

* * * * *